(12) United States Patent
Hobbs et al.

(10) Patent No.: US 7,782,339 B1
(45) Date of Patent: Aug. 24, 2010

(54) METHOD AND APPARATUS FOR GENERATING MASKS FOR A MULTI-LAYER IMAGE DECOMPOSITION

(75) Inventors: David V. Hobbs, Surrey (CA); Kimberly Marie Tucker, Vancouver (CA)

(73) Assignee: Teradici Corporation (CA)

( * ) Notice: Subject to any disclaimer, the term of this patent is extended or adjusted under 35 U.S.C. 154(b) by 243 days.

(21) Appl. No.: 11/173,303

(22) Filed: Jun. 30, 2005

Related U.S. Application Data

(60) Provisional application No. 60/584,869, filed on Jun. 30, 2004.

(51) Int. Cl.
*G09G 5/02* (2006.01)

(52) U.S. Cl. ............... 345/626; 345/555; 345/612; 345/614; 345/698

(58) Field of Classification Search ................ 345/626, 345/555, 612, 614, 698
See application file for complete search history.

(56) References Cited

U.S. PATENT DOCUMENTS

| | | | |
|---|---|---|---|
| 5,583,573 A | 12/1996 | Asamura et al. | |
| 5,586,200 A | 12/1996 | Devaney et al. | |
| 5,767,978 A | 6/1998 | Revankar et al. | |
| 5,915,044 A * | 6/1999 | Gardos et al. | 382/236 |
| 5,949,555 A | 9/1999 | Sakai et al. | 358/462 |
| 5,990,852 A | 11/1999 | Szamrej | 345/2 |
| 6,633,670 B1 * | 10/2003 | Matthews | 382/176 |
| 6,664,969 B1 | 12/2003 | Emerson et al. | 345/544 |
| 6,701,012 B1 | 3/2004 | Matthews | |
| 6,995,763 B2 * | 2/2006 | Gatti et al. | 345/424 |
| 7,016,080 B2 | 3/2006 | Edgar | |
| 7,120,297 B2 * | 10/2006 | Simard et al. | 382/166 |
| 7,202,872 B2 * | 4/2007 | Paltashev et al. | 345/555 |
| 7,221,810 B2 * | 5/2007 | Andreasson et al. | 382/284 |
| 7,246,342 B2 * | 7/2007 | Hsu et al. | 716/19 |
| 7,333,657 B1 * | 2/2008 | Stolin et al. | 382/176 |
| 2003/0072487 A1 | 4/2003 | Fan et al. | |
| 2003/0133617 A1 | 7/2003 | Mukherjee | |
| 2003/0156760 A1 | 8/2003 | Navon et al. | |
| 2003/0185454 A1 | 10/2003 | Simard et al. | |
| 2003/0197715 A1 * | 10/2003 | Hosokawa et al. | 345/619 |
| 2003/0202697 A1 * | 10/2003 | Simard et al. | 382/195 |
| 2003/0202699 A1 | 10/2003 | Simard et al. | |
| 2004/0010622 A1 | 1/2004 | O'Neill et al. | |
| 2005/0053278 A1 * | 3/2005 | Li | 382/164 |
| 2005/0270307 A1 * | 12/2005 | Jacques Brouaux | 345/619 |

(Continued)

OTHER PUBLICATIONS

Fragment-based image completion Iddo Drori, Daniel Cohen-Or, Hezy Yeshurun Jul. 2003 ACM Transactions on Graphics (TOG), ACM SIGGRAPH 2003 Papers SIGGRAPH 03, vol. 22 Issue 3 Publisher: ACM Press.*

(Continued)

*Primary Examiner*—Javid A Amini
(74) *Attorney, Agent, or Firm*—John W. Crosby

(57) ABSTRACT

Decomposing a computer display image into different layer types and associated masks based on the unique nature of the image is disclosed. These types include text, objects, background and pictures. A set of image masks is used to uniquely identify different layer types within an image, where each layer type includes none, some or all of the pixels of the original image. Each layer of the image is processed prior to transmission (i.e. compressed) using a method appropriate for the characteristics of that layer.

8 Claims, 23 Drawing Sheets

U.S. PATENT DOCUMENTS

2006/0031755 A1* 2/2006 Kashi .................. 715/512
2007/0025622 A1* 2/2007 Simard et al. ............. 382/232

OTHER PUBLICATIONS

Tour into the picture: using a spidery mesh interface to make animation from a single image Youichi Horry, Ken-Ichi Anjyo, Kiyoshi Arai Aug. 1997 SIGGRAPH '97: Proceedings of the 24th annual conference on Computer graphics and interactive techniques Publisher: ACM Press/Addison-Wesley Publishing Co.*

Finding text in images Victor Wu, R. Manmatha, Edward M. Riseman Jul. 1997 DL '97: Proceedings of the second ACM international conference on Digital libraries Publisher: ACM.*

William Rucklidge, Digipaper: A Versatile Color Document Image Representation, Proceedings of the IEEE, International Conference on Image Processing, Kobe, Japan, Oct. 24-25, 1999.*

Broder, Andrei et al., "Pattern-based compression of text images," Digital Syst. Res. Center and Michael Mitzenmacher, Dept. Of Computer Science, UC Berkeley, Data Compression Conference 1996, pp. 300-309, 1996.

Gilbert, Jeffrey M. et al., "A Lossless 2-D Image Compression Technique for Synthetic Discrete-Tone Images," in Proceedings of the Data Compression Conference (DCC), 10 pages, Mar.-Apr. 1998.

Draft ITU-T Recommendation T.44 "Mixed Raster Content (MRC)," International Telecommunication Union, Study Group 8 (Contribution (Oct. 1997).

Keechul Jung, Kwang In Kim, Anil K. Jain: Text Information Extraction in Images and Video: A Survey. *Pattern Recognition, vol.* 37(5), pp. 977-997, www.cse.msu.edu/prip/Files/TextDetectionSurvey.pdf, 2004.

Li et al., "Text and Picture Segmentation by the Distribution Analysis of Wavelet Coefficients," Proceedings of the 1998 IEEE International Conference on Image Processing (ICIP-98), Chicago, Illinois, vol. 3, pp. 790-794, Oct. 4-7, 1998.

Lienhart, Rainer et al., "Video OCR: A Survey and Practitioner's Guide," in Video Mining, Kluwer Academic Publisher, pp. 155-184, Oct. 2003.

Lienhart, Rainer et al., "Automatic Text Segmentation and Text Recognition for Video Indexing," Mulitmedia Systems, vol. 8, No. 1, pp. 69-81, Jan. 2000.

Lin, Tony, et al., "Hybrid Image Coding for Real-Time Computer Screen Video Transmission," Visual Communications and Image Processing (VCIP), part of the IS&T/SPIE Symposium on Electronic Imaging, 12 pages, San Jose, CA, USA, Jan. 18-22, 2004.

Jason Nieh, S. et al., "A Comparison of Thin-Client Computing Architectures," Technical Report CUCS-022-00, www.nomachine.com/documentation/pdf/cucs-022-00.pdf, 16 pages, Nov 2000.

Oliveira, Inês et al., "Image Processing Techniques for Video Content Extraction," ERCIM Workshop Proceedings—No. 97-W004; www.ercim.org/publication/ ws-proceedings/DELOS4/oliveira.pdf, San Miniato, Aug. 28-30, 1997.

Queiroz, Ricardo L. de et al., "Optimizing Block-Thresholding Segmentation for Multilayer Compression of Compound Images," IEEE Transactions on Image Processing, vol. 9, No. 9, pp. 1461-1471, Sep. 2000.

Queiroz, Ricardo L de et al., Mixed Raster Content (MRC) Model for Compound Image Compression, Corporate Research & Technology, Xerox Corp., Proceedings SPIE, Visual Communications and Image Processng, vol. 3653, pp. 1106-1117, Jan. 1999.

Said, Amir, "Compression of Compound Images and Video for Enabling Rich Media in Embedded Systems," Imaging Systems Laboratory, HP Laboratories Palo Alto, HPL-2004-89, 14 pages, May 11, 2004.

Sato, T. et al., Video OCR for Digital News Archives. IEEE International Workshop on Content-Based Access of Image and Video Database (CAIVD '98), Los Alamitos, CA, pp. 52-60, Jan. 1998.

Starck, J.-L. et al., "Image Decomposition: Separation of Texture from Piecewise Smooth Content," www-sccm.stanford.edu/~elad/Conferences/19_Separation_SPIE_2003.pdf, 12 pages, 2003.

Vasconcelos, Nuno et al., "Statistical Models of Video Structure for Content Analysis and Characterization," IEEE Transactions on Image Processing, vol. 9, No. 1, 15 pages, Jan. 2000.

Wang, Wei et al., "Identification of Objects From Image Regions," http://www.cse.buffalo.edu/DBGROUP/psfiles/Wang/icme2003.pd, NSF Digital Government Grant EIA-9983430, 4 pages, 2003.

V. Wu, et al., "Finding Text in Images", In Proceedings of Second ACM International Conference on Digital Libraries, Philadelphia, PA, pp. 3-12, 1997.

Yuan, Xiaojing et al., "Multi-scale Feature Identification Using Evolution Strategies," (Mechanical Engineering Department, Tulane University, New Orleans), Preprint submitted to Elsevier Science, 16 pages, Aug. 11, 2003.

Jeffery Michael Gilbert, "Text/Graphics and Image Transmission over Bandlimited Lossy Links", A thesis submitted in partial satisfaction of the requirements for the degree of Doctor of Philosophy in Engineering Electrical Engineering and Computer Sciences in the Graduate Division of the University of California, Berkeley, Spring 2000, 276 pages, Berkeley, CA.

Tony Lin, Pengwei Hao, Chao Xu & Ju-Fu Feng, "Hybrid image coding for real-time computer screen video transmission", Visual Communications and Image Processing (VCIP), part of the IS&T/SPIE Symposium on Electronic Imaging 2004, 12 pages, Jan. 2004, San Jose, CA.

Tony Lin, Pengwei Hao; Sang UK Lee, "Efficient Coding of Computer Generated Compound Images", IEEE International Conference on Image Processing, ICIP 2005, Sep. 2005, pp. 561-564, vol. 1, Genoa, Itally.

* cited by examiner

Pixel Table
T - Text Pixel
B - Background Pixel
C - Color Match Pixel

Pixel Table
A - Text Pixel
B - Background Pixel

METHOD AND APPARATUS FOR GENERATING MASKS FOR A MULTI-LAYER IMAGE DECOMPOSITION

CROSS-REFERENCE TO RELATED APPLICATION

The present application claims priority to U.S. Provisional Application Ser. No. 60/584,869, filed Jun. 30, 2004, entitled "Methods for Generating Masks for a Multi-Layer Image Decomposition," incorporated by reference herein in its entirety.

FIELD OF THE INVENTION

The present invention relates to the field of image analysis. More particularly, the invention relates to segmenting an image into layers that distinguish between text, objects, background and pictures. Object layers include graphics objects while picture layers include textural images such as photographs.

BACKGROUND OF THE INVENTION

Historic advances in computer technology have made it economical for individual users to have their own computing system, which caused the proliferation of the Personal Computer (PC). Continued advances of this computer technology have made these personal computers very powerful but also complex and difficult to manage. For this and other reasons, there is a desire in many workplace environments to separate the user interface devices, including the display and keyboard, from the application processing parts of the computing system. In this preferred configuration, the user interface devices are physically located at the user's location, while the processing and storage components of the computer are placed in a central location. The user interface devices are then connected to the processor and storage components with some method of communication.

Several commercial techniques exist to support the transmission of these user interface signals over standard networks and some are compared in "A Comparison of Thin-Client Computing Architectures", Technical Report CUCS-022-00, Jason Nieh, S. Jae Yang and Naomi Novik, Network Computing Laboratory, Columbia University, November 2000. One of the challenges facing all of the techniques described in Nieh is transmission of the vast amounts of display data from the processing components to the remote computer across a standard network of relatively low bandwidth. Image compression and transmission differs from other real-time video applications such as broadcast video or offline applications such as optical character recognition (OCR) in a number of ways. Firstly, the image is derived directly from a digital visual interface (DVI) or equivalent noise-free digital source signal as compared with analog video signals or techniques that scan images that inherently include noise. Secondly, the image includes artifacts such as boxes or borders that are common to computer display images and lend themselves to efficient compression. Thirdly, the images include other characteristics associated with computer display images but not associated with motion video or other natural images such as areas of exactly matched color levels and accurately aligned artifacts which also lend themselves to efficient compression.

Text is a common image type. It is desirable to identify text so it can be compressed separately to allow lossless reproduction. Once text elements are identified and separated, they can be compressed efficiently. One compression technique would be to cache the shape and color of the text parts so they can be reused on different images or parts of the image.

A second type of image that is desirable for lossless reproduction is the background artifact type. These artifacts include window backgrounds and other large geometry areas with few colors. Background image types may be coded as a set of graphic commands, which allows for highly efficient compression in addition to lossless reproduction. Furthermore, a background frequently remains constant in an otherwise continuously changing display. By including a separate background type, a remote display can use historic background information rather than requiring the retransmission of static information. This improves the frame-to-frame compression of the display.

A third image type is the picture type. Pictures or natural images that have texture or a large number of colors may be compressed using lossy compression algorithms with little or no noticeable difference. By using a lossy algorithm, pictures can be compressed efficiently.

A fourth image type is the object type that includes areas of high contrast such as graphics, icons and text or other low contrast artifacts surrounded by picture areas. Object types may be encoded using lossless or high quality lossy compression methods. Object types may also be cached and reused. The identification of different types of objects within an image for the purposes of image or video compression is standard practice. Different existing algorithms define "an object" in different ways, depending on the method in which the object is handled. However, previous definitions for an "object" still fail to define a group of pixels in such a way as to more effectively enable compression.

Accuracy of image type identification affects both the quality of the decompressed image as well as the compression ratio. While it is important to maximize the compression in this application, it is more important to ensure the areas of text and graphics and have been correctly identified so they are reproduced accurately.

Layering an image into multiple planes of different image types is a technique that is common use. An mage format based on this is specified in "Mixed Raster Content (MRC)," Draft ITU-T Recommendation T.44, International Telecommunication Union, Study Group 8 (Contribution (10/97). The recommended model defines the image as three planes: a text or graphics plane, a background plane containing continuous tone images and a mask plane. While the recommendation identifies the interchange format, it does not provide a method for generating the mask.

Some related methods for generating decomposition masks are found in text extraction methods. A survey of text extraction methods is provided by Jung et al. in "Text Information Extraction in Images and Video: a Survey, Pattern Recognition 37 (5): 977-997 (2004).

A method for identifying text in images is described by Sato, T., et al., in "Video OCR for Digital News Archives," IEEE International Workshop on Content-Based Access of Image and Video Database (CAVID '98), pp. 52-60, 1997. Sato et al describe a text mask that is generated by filtering the image. The image is filtered using four directional filters that highlight the shape contrast of a text image. The results of the four filtered images are summed and quantified to generate a text image or mask. While filtering an image in multiple directions and summing the results produces a reasonable mask, it is computationally intensive and does not take advantage of the characteristics of text in a computer display image. The resulting mask can lead to missed and false indications that reduce the compression and image quality.

A method for identifying text in pictures by V. Wu, et al., "Finding Text in Images," Proceedings of Second ACM International Conference on Digital Libraries, Philadelphia, Pa., pp. 3-12, 1997. In this method, the filtered image is segmented into strokes and chips. Strokes identify lines that build characters and chips identify groups of characters or words. This helps identify text more accurately from other images, which is important for OCR, but is not as necessary for image decomposition. Chip segmentation can also remove small areas of text, like highlighted words, from the mask, reducing the quality of the mask.

Other related methods for mask generation for image decomposition look at separating high-contrast areas from flat areas so they can be compressed differently.

A method for decomposing an image is disclosed by Li et al., "Text and Picture Segmentation by the Distribution Analysis of Wavelet Coefficients" IEEE/ICIP Chicago, Ill. Proceedings, October 1999. This method segments the display into blocks of text, pictures or backgrounds using histograms of wavelet coefficients. While this identifies the image layers, plus the mask layers, it does it at a block resolution. Blocks of multiple pixels cannot create the proper boundaries between these image types. As a result, this method does not provide sufficient compression or image quality.

In U.S. Pat. No. 5,949,555, "Image Processing Apparatus and Method," Sakai et al. describe a method for decomposing an image. This method uses the shape of objects to identify image types and partitions the image into rectangular areas of different image types. A shortcoming of this method is that the image type is not defined at pixel resolution and therefore it is not possible to select the best compression mechanism in all cases, resulting in either lossy compression of critical information or inefficient compression for non-critical information. Another shortcoming of this method lies in its inability to trace anti-aliased text or text on a textured background because these text types do not have hard edges that can be traced to identify the shape.

In U.S. Pat. No. 6,633,670, "Mask generation for multi-layer image decomposition," Matthews describes a simpler method for decomposing an image. Rather than identifying areas of text, this method identifies areas of high contrast, which likely include text. The method uses pixel gradients to identify areas of high contrast and then clusters the pixels to generate a mask. This method is not capable of accurately distinguishing between text and textured images. Additionally, the method uses only one mask to distinguish between foreground and background image types, thus limiting options for dealing with the variety of image types associated with a computer display.

In summary, none of the existing methods decompose a computer display image for compression and accurate reproduction. None of the methods identify text, objects, background and picture images separately and at a pixel resolution. Existing methods that provide reasonable accuracy of text identification are too computationally intensive for practical real-time decomposition. None of the methods take advantage of the image characteristics and artifacts of a computer display to simplify and improve the image decomposition. None of the methods decompose the image by identifying backgrounds graphic commands that can compress well. None of the methods identify text on a background surface, which is highly repetitive and lends itself to efficient compression.

SUMMARY OF THE INVENTION

The present invention relates to the preparation of the computer display image for efficient compression so that it may be transmitted across the network and accurately reproduced at the remote computer. Embodiments of the present invention decompose a computer display image into different layer types and associated masks based on the unique nature of the image. These types include text, objects, background and pictures. A set of image masks is used to uniquely identify different layer types within an image, where each layer type includes none, some or all of the pixels of the original image. Each layer of the image is processed prior to transmission (i.e. compressed) using a method appropriate for the characteristics of that layer. For example, a picture layer may be compressed using a different method to the method used to compress a text layer. Compression techniques such as Run-Length Encoding (RLE) Lempel Ziv Walsh (LZW) encoding, Joint Photographic Experts Group (JPEG) compression, and Motion Picture Experts Group (MPEG) may be used. Depending on the compression method used, data may be compressed on a per frame basis (e.g. LZW, JPEG), or across frame updates (E.G. MPEG).

In order to determine if a pixel from the original image is represented on a layer, every layer is assigned a single-bit pixel mask of the same dimensions of the original image. If a pixel from the original image is represented on a layer, the corresponding bit in the pixel mask for that layer is set. Once the image is decomposed, the original image and the mask is forwarded to the processing method defined for that layer and the mask is used by the processing method to identify which pixels of the image should be processed.

In an embodiment, each mask is implemented as an array. The present invention decomposes the image into four mutually exclusive layers, so therefore the entire mask set may be described using a two-dimensional array of the same dimension as the original image with each array element defined as a two bit value. Each two-bit value describes four different states and each state identifies the presence of a pixel on one of the four layers of the image. In alternative embodiments, for example in cases where the masks are not mutually exclusive or cases where more than four masks are defined, other structures are feasible. For example, each mask may be implemented as two-dimensional array of single-bit elements, with the mask having the same dimensions as the computer display image. In an embodiment, the four masks and the compressed 16×16 pixel portion of the computer display image form a discrete packet that is transmitted to a remote client in a data stream as illustrated below:

|etc.|- - - - - - - -16×16 data- - - - - - - -|M4|M3|M2|
M1|- - - - - - - -16×16 data- - - - - - - -|M4|M3|M2|
M1|- - - - - - -16×16 data- - - - - - - -|M4|M3|M2|M1|FRAME HEADER The objective of the present invention is to prepare a digital computer display image for efficient compression and subsequent reproduction by taking advantage of the attributes of a computer image and the digital nature of the image source.

In one aspect, the present invention decomposes the image into multiple layer types and generates masks for each type. In the preferred embodiment, the image is decomposed into separate text, object, background and picture types, where each type has an associated image mask for that type. In accordance with the embodiment, the present invention identifies background areas and generates a background mask, identifies text and object areas and generates text and object masks, expands and optimizes the identified background areas and masks, and expands the identified text and object areas and their masks. In an embodiment, the process of background, text and object optimization is repeated until satisfactory decomposition is accomplished. A picture mask is generated and optimized to remove small isolated areas of one image type.

In another aspect, the present invention applies a range of filters to an image to identify text within the image. In the preferred embodiment, horizontal, vertical and diagonal filters are applied to the image to identify areas of high contrast. As a filter is applied to the image, each pixel that meets a defined contrast threshold criterion for possible identification is temporarily marked as a candidate for a text mask. These marks are accumulated for each pixel over a small area to identify text centers and positively identify pixels that exceed a predefined text density threshold as text. This aspect of the invention overcomes the limitations of computationally intensive text recognition schemes of prior solutions that are unsuitable for real-time applications.

In another aspect, the present invention identifies object types. In the preferred embodiment two types of objects are identified. The first type of objects includes small, low-contrast regions of the image that are completely surrounded by background. The second type of objects includes high-contrast regions that are not completely surrounded by background.

In another aspect, the present invention identifies background areas as related extensions of a basic shape within defined color limits that can be described using graphic commands. In the preferred embodiment, horizontal, vertical and diagonal lines of a matched color are identified as background lines; consecutive lines of the same color are identified as background rectangles or shapes; consecutive lines of different colors are identified as gradient background and large areas of the same color are identified as the default background, which may or may not be rectangular in shape. In this aspect, the present invention identifies background features of an image that can be described in terms of highly-compressible graphics descriptors.

In another aspect, the present invention identifies pictures in an image as picture types. In the preferred embodiment, areas of the image that are not text, background or objects are identified as picture types.

In yet another aspect, the present invention improves the compressibility of an image. In the preferred embodiment, small areas are reclassified as larger surrounding areas. In accordance with the embodiment, the present invention reclassifies background types surrounded by text types as text types, background types surrounded by picture types as picture types, and picture types surrounded by objects as objects types.

In yet another aspect, the present invention improves the compressibility of an image by classifying high-contrast areas of an image such as text, graphics, or icons as either text or object types. In the preferred embodiment, these same general text areas that are at least partially surrounded by pictures are reclassified as unbounded objects while those surrounded wholly by background remain classified as text.

In summary, the present invention provides real-time decomposition of text, objects, background and pictures at a pixel level that is critical for the perception-free compression and reproduction of a computer display image. Furthermore, the present invention decomposes an image based on expected digital computer display image artifacts, resulting in optimized decomposition of the image.

Many other features and advantages of the present invention will become apparent upon reading the following detailed description, when considered in conjunction with the accompanying drawings.

DETAILED DESCRIPTION OF THE DRAWINGS

Figure 1:
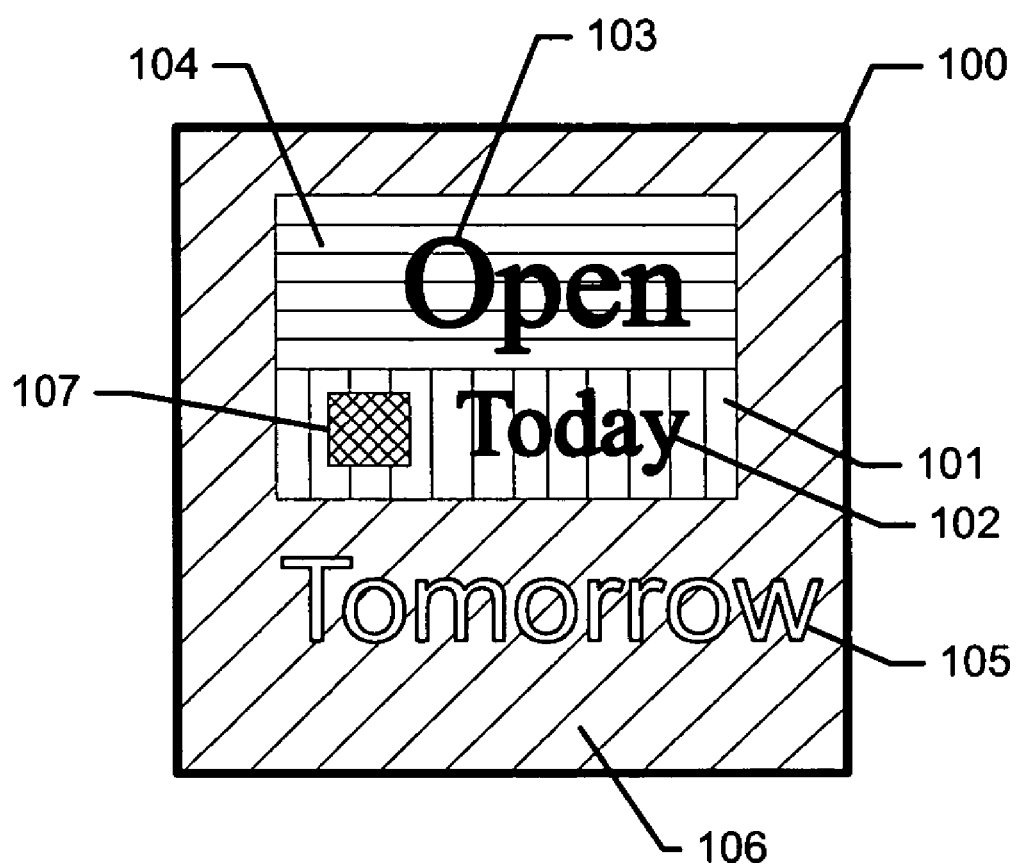
FIG. 1 illustrates a representation of a grayscale image containing image types that might be found on a computer display.

FIG. 1 represents an example of a grayscale or color image 100 that might be seen in a section of a computer display. The section is composed of text and other artifacts on a variety of different backgrounds. The underlying background for the entire section is a picture background as represented by area 106. For example, area 106 might be a photograph. Area 106 is overlaid with text 105 "Tomorrow" and two styles of boxes, each with additional text overlays. Box 104 represents a vertical gradient in color tone. Box 104 is overlaid with black text "Open" 103. Box 101 has a single gray tone and is overlaid by anti-aliased text "Today" 102 and small square object 107 of a different gray tone.

The objective of the method described herein is to decompose the image represented by FIG. 1 into layers of different image types and corresponding masks as a preparation step for effective image compression. In the preferred embodiment, each mask is a map of one-bit pixels of the image where the bit value of 1 positively identifies a pixel as an element of that mask.

The present invention distinguishes between five types of images and generates a mask for each of the five image types. The five types of images include background, text, picture, type 1 object, and type 2 object. In a preferred embodiment, the object image type depends on the background characteristics for the objects. FIGS. 2A through 2E show the image decomposed into the five image types described, each type associated with its own mask.

Figure 2A:
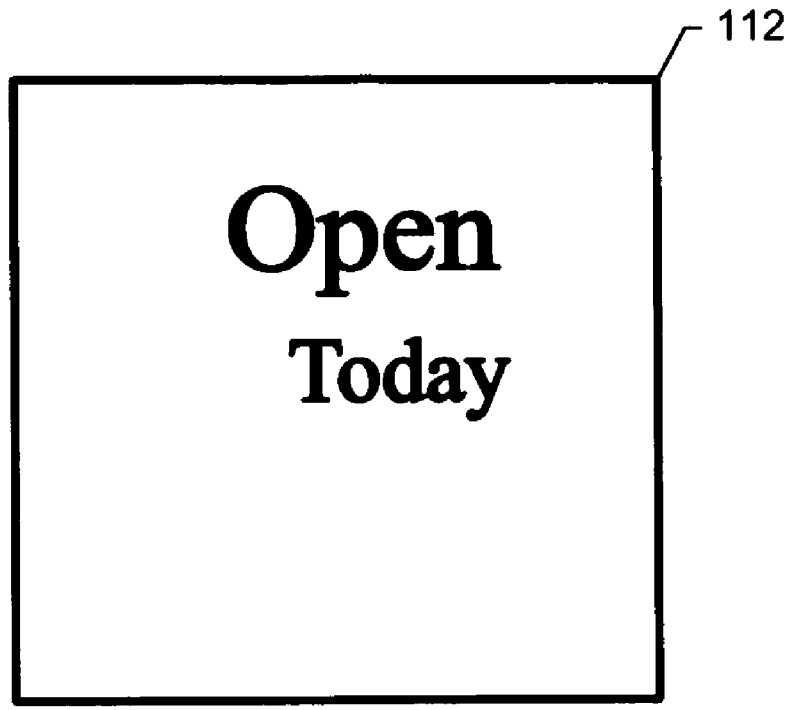
FIGS. 2A-2E illustrate the decomposition of an exemplary image into five different image layers and masks.
Figure 2A:
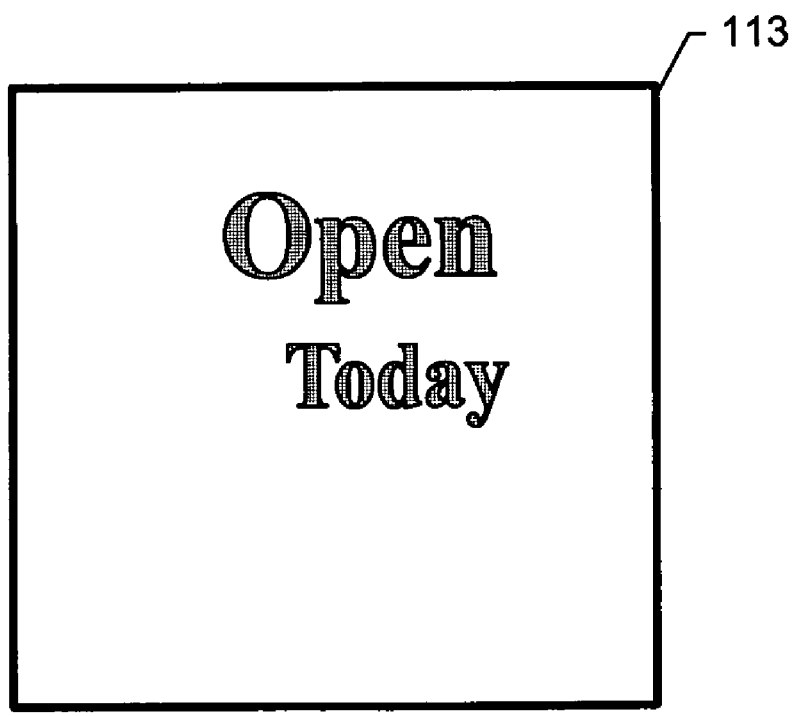
Figure 2B:
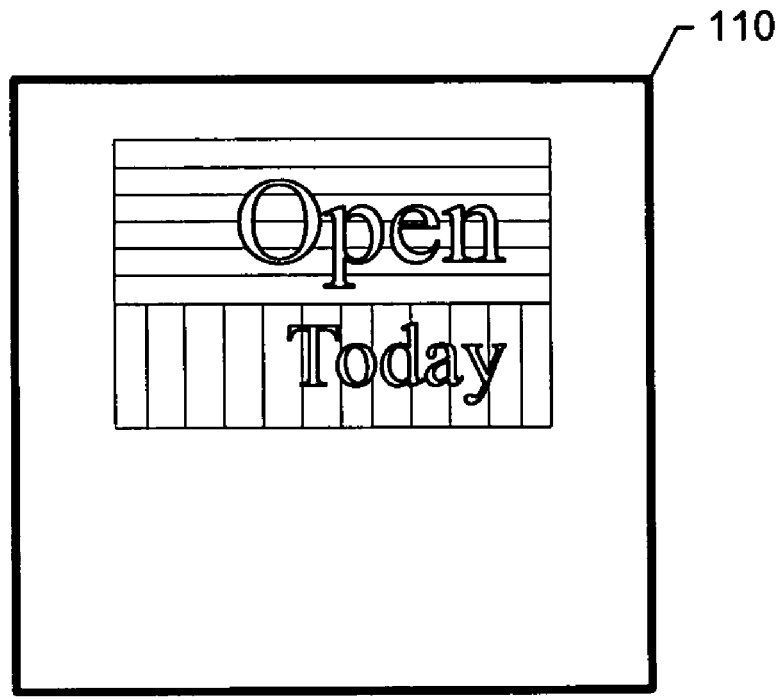
Figure 2B:
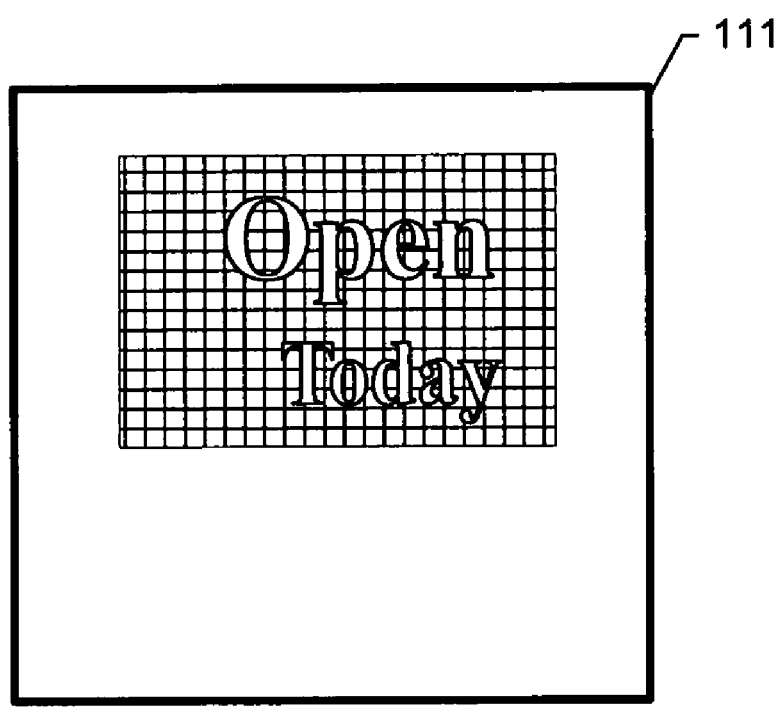

Text image type 112 shown in FIG. 2A is defined by any small high-contrast area that is surrounded by background image type 110 shown in FIG. 2B. Text image types require accurate or lossless reproduction. Given that text is often small in size and spatially repeated, text image elements compress well. The text layer of an image is identified by text mask 113 shown in FIG. 2A.

Background image type 110 in FIG. 2B, as identified by mask 111, is defined as any area that may be described using a graphical primitive that can easily be regenerated. In the preferred embodiment, the basic graphical primitive is a line. Multiple lines of the same color represent solid color areas 101. Multiple lines of different colors represent gradient areas 104 of background. When the entire image 100 is regenerated, text image regions 112 overwrite the background image regions, thus allowing the background to be defined as continuous graphical objects through the text regions. To ensure that background regions are maximized in area and not constrained by regions of text, text regions identified by text mask 113 are first identified and then marked as "don't-care" regions for the subsequent background decomposition analysis. In this embodiment, long lines of the same length and the same color are used to describe areas of background image. These simple graphics descriptors are efficiently compressed and enable lossless background image reproduction.

Figure 2C:
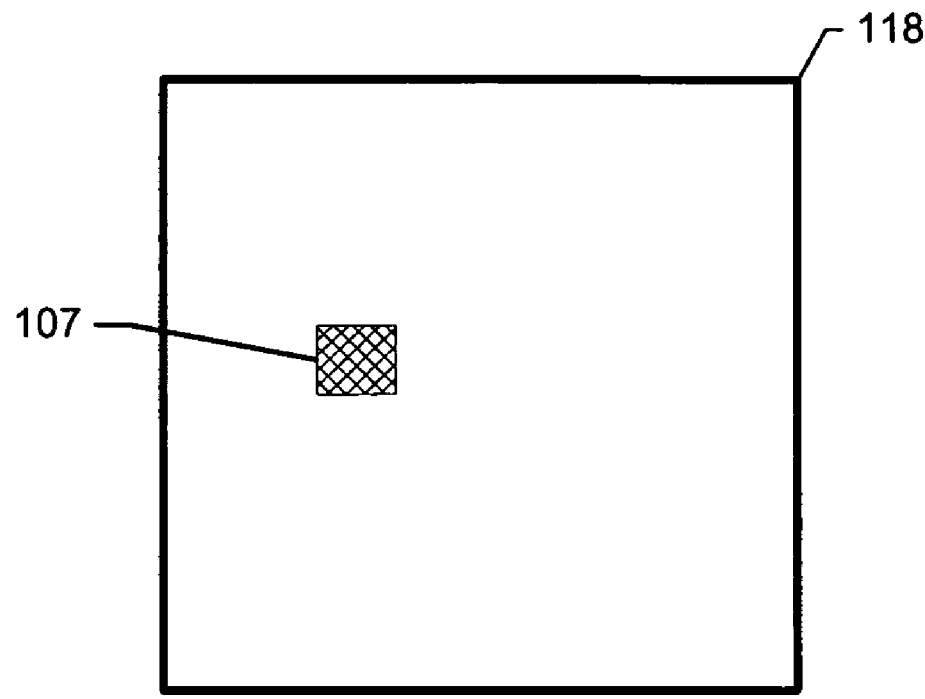
Figure 2C:
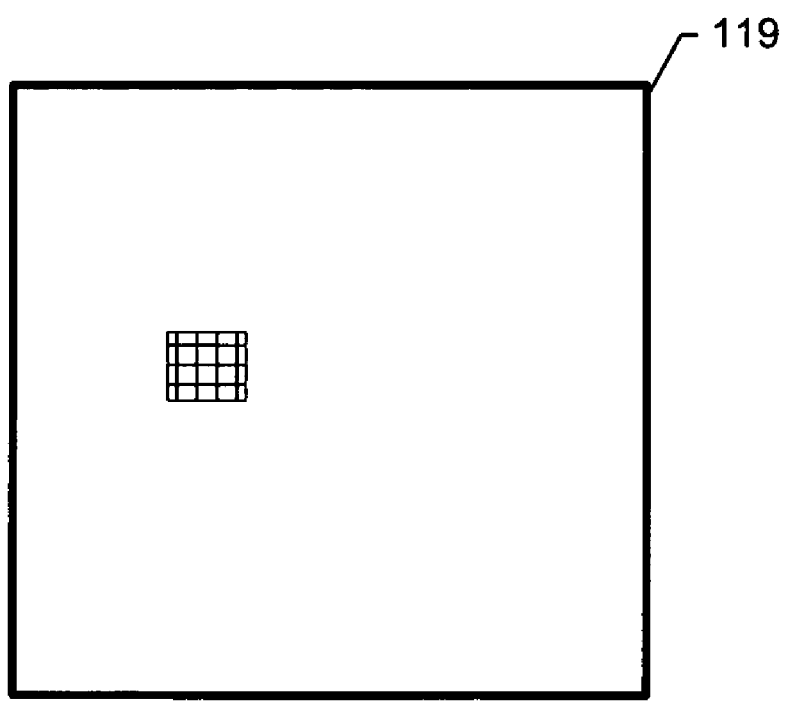
Figure 2D:
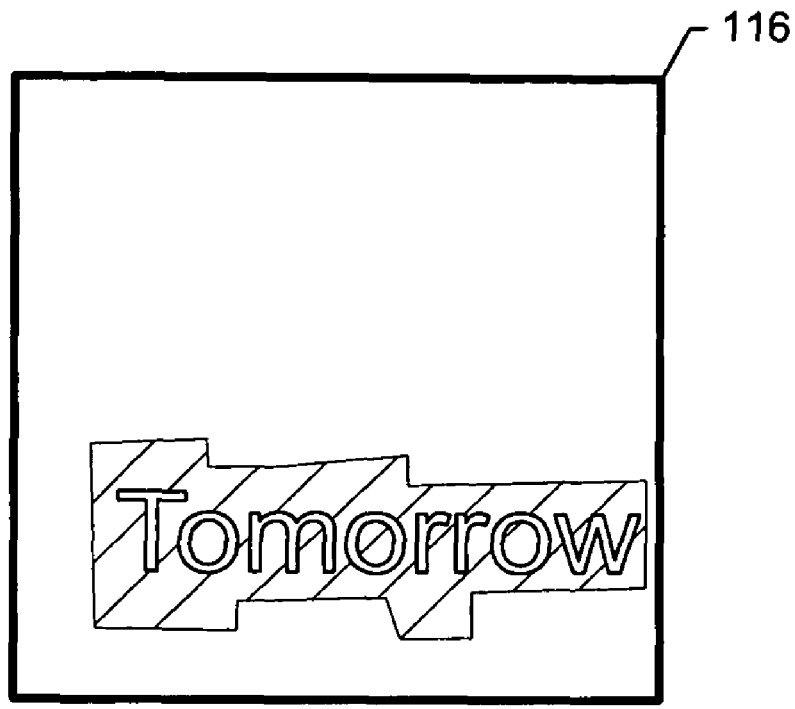
Figure 2D:
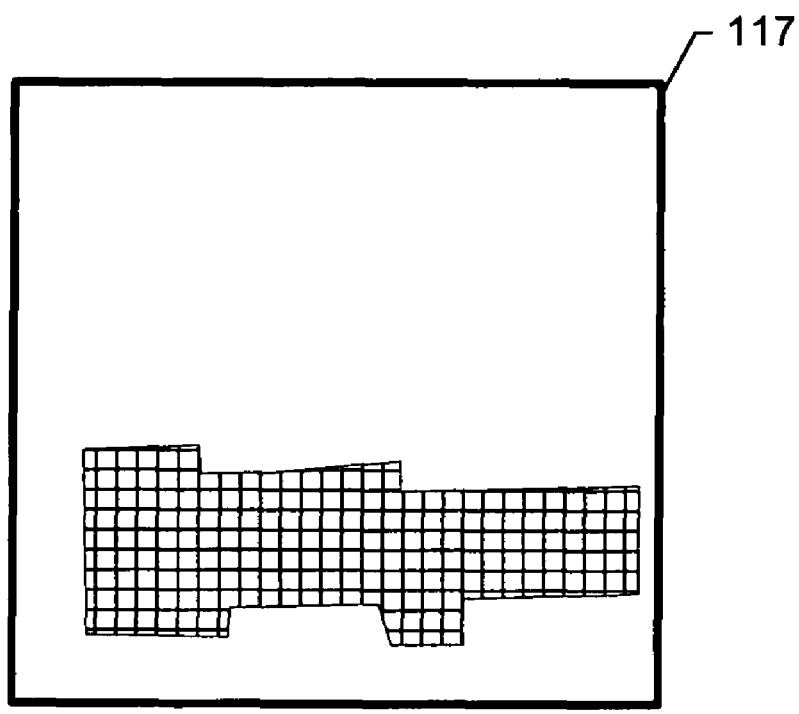

The present embodiment distinguishes between two types of objects as these may be handled by separate compression processes. Firstly, small, low-contrast regions that are surrounded by background or text, for example, small square 107 shown on type 1 object layer 118 with mask 119 in FIG. 2C, are classified as type 1 objects. Secondly, text, graphics, icons, or other high-contrast regions that are at least partially surrounded by picture image types are classified as type 2 objects. Text 105 is an example of a type 2 object shown on its own layer 116 with mask 117 in FIG. 2D. Type 1 objects are typically reconstructed using lossless techniques while type 2 objects may be compressed using either lossless or high quality lossy compression techniques.

Figure 2E:
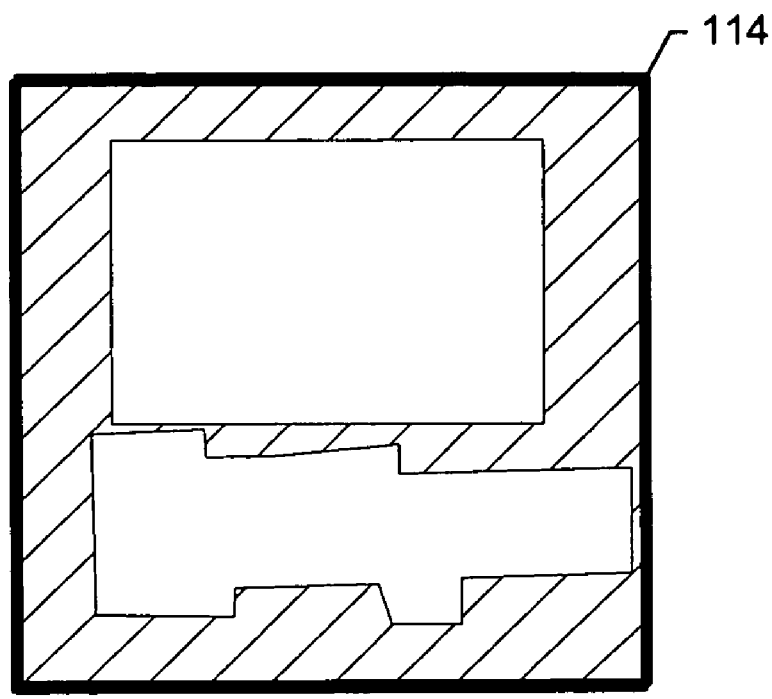
Figure 2E:
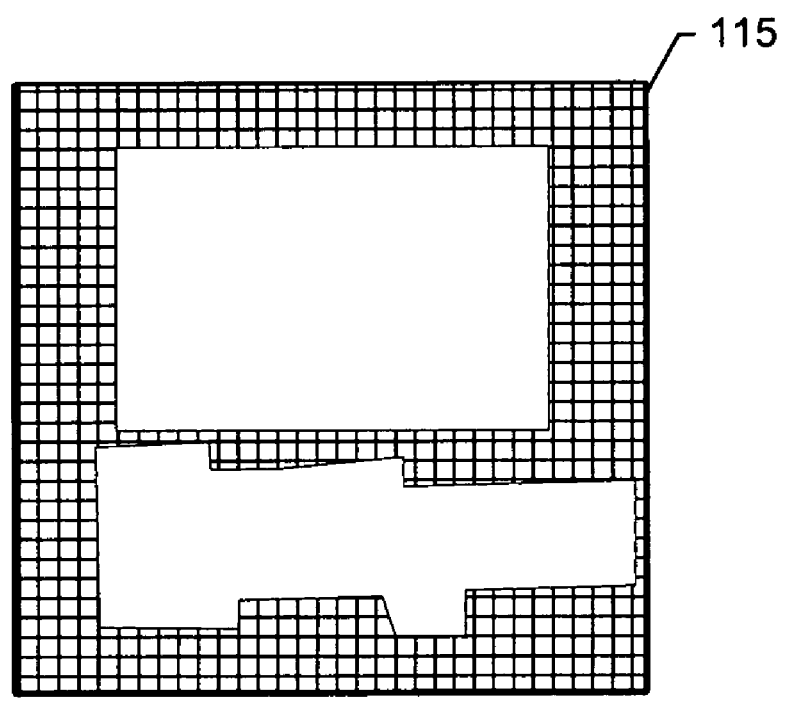

Once the text image mask, object image mask and background image mask have been defined, the remaining area is defined as picture image 114 as identified by picture mask 115 in FIG. 2E. Picture images do not have the high-contrast detail of text or objects and are not flat graphic images as captured by the background image area. The picture area is made up of photographs or other textured images that can be reproduced using photographic compression techniques.

Figure 3:
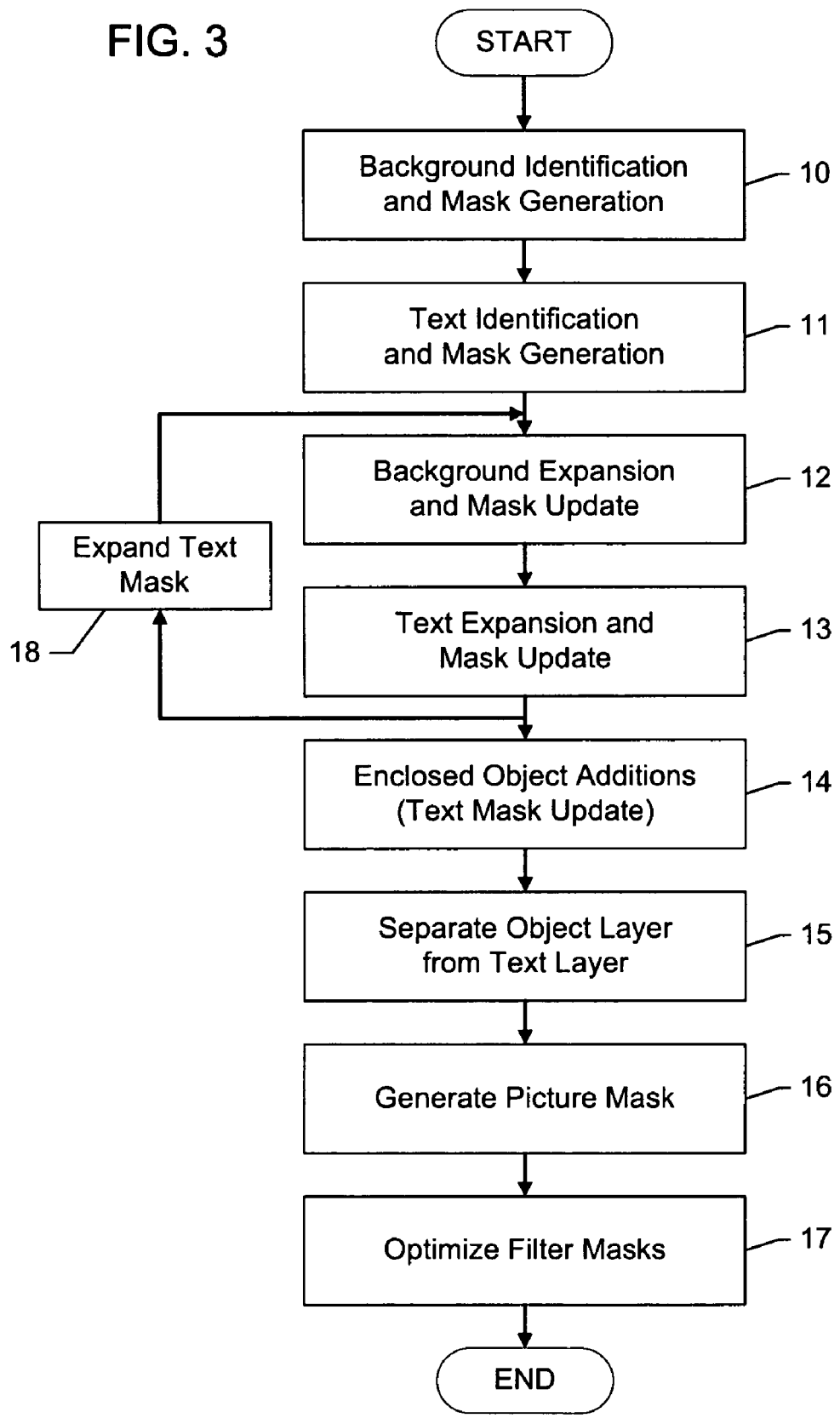
FIG. 3 illustrates in flow chart form the image decomposition method.

FIG. 3 illustrates the top-level flow chart for the image decomposition process. The first operation is the identification of background areas. Background areas that can be identified before other image types are identified and marked at act 10. High-contrast filters, including saturated pixel filters and other pixel pattern filters, are then used to identify and mark high-contrast areas including text, graphics or icons (act 11). Once these high-contrast filters have been applied, the text mask contains both text and type 2 object types. The background mask is updated to include additional background areas that are identified and marked (act 12) using the current text mask.

Next, at act 13, the text mask is cleared of pixels that are assigned both as text and background using the updated background mask. During act 14, small areas that are not identified in the text or background masks are reviewed based on the image type of neighboring pixels. Small areas adjacent to text, background, or type 1 objects are reclassified. At act 15, the text mask is divided into two layers: type 2 object layer 116 and text layer 112. The object layer consists of areas on the original text mask that are not fully surrounded by background. Pixels in the object layer are removed from the text mask and placed in the object mask. The text layer consists of areas on the original text mask that are fully surrounded by background. Pixels in the text layer remain on the text mask. At act 16, pixels that are not already identified as text, objects or background are identified as picture pixels in the picture mask. At act 17, the mask set is filtered to redefine small, isolated images that may hinder optimum compression and can be reclassified without degrading the image quality. In an embodiment, at optional act 18, the text mask is expanded through iterations of acts 12 and 13 until a desired level of quality is achieved for the text mask and the background mask.

Background Identification

Figure 4:
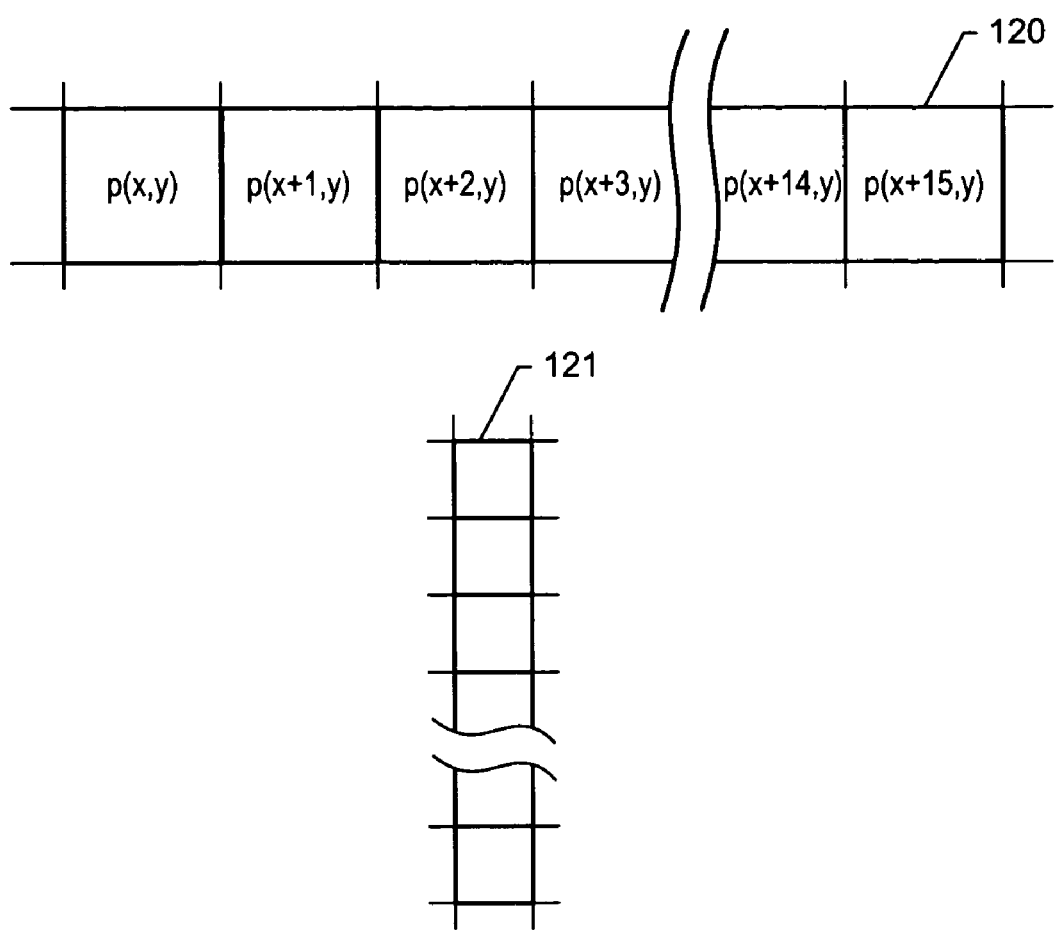
FIG. 4 illustrates a filter used to identify background images.

FIG. 4 illustrates one of the filters that may be used to identify background pixels suitable for coding as graphical objects. The filter seeks horizontal area 120 or vertical rectangular area 121 of dimension m by n pixels as referenced in the formula below. Each pixel p(x,y) is tested for a background match. Pixels that are either exactly matched in color or are within a defined limit of color "d" are identified as background:

For series i={1, 2, 3, . . . , m} and j={1, 2, 3, . . . n}

$$|p(x,y)-p(x+i,y+j)|<=d \qquad (1)$$

In this preferred embodiment of the invention, the filter seeks a line of adjacent pixels that is 16 pixels in length with all pixels matching in color. A variation of this filter may allow small variations in color. In cases where these variations are not factored into the graphics primitive for the background, the compression process would reduce the image quality. Pixels that meet the background filter criteria are marked as background pixels.

Other filter embodiments that may be used to identify background pixels are rectangular area filters, diagonal lines, dotted or dashed lines, and color lines of even gradient. Embodiments of the present invention describe a graphic artifact using a simple formula. This ensures that the graphic descriptor is simple to generate and the background is readily compressed. As more pixels are identified by each graphic descriptor, the resulting compression ratio improves.

In an embodiment, a graphic descriptor that can be used to determine that the background is a default background color for an area or an entire display. This descriptor should be used cautiously for backgrounds with complex shapes because little or no advantage is gained if a complex description is needed to describe the outline of the image.

Figure 5:
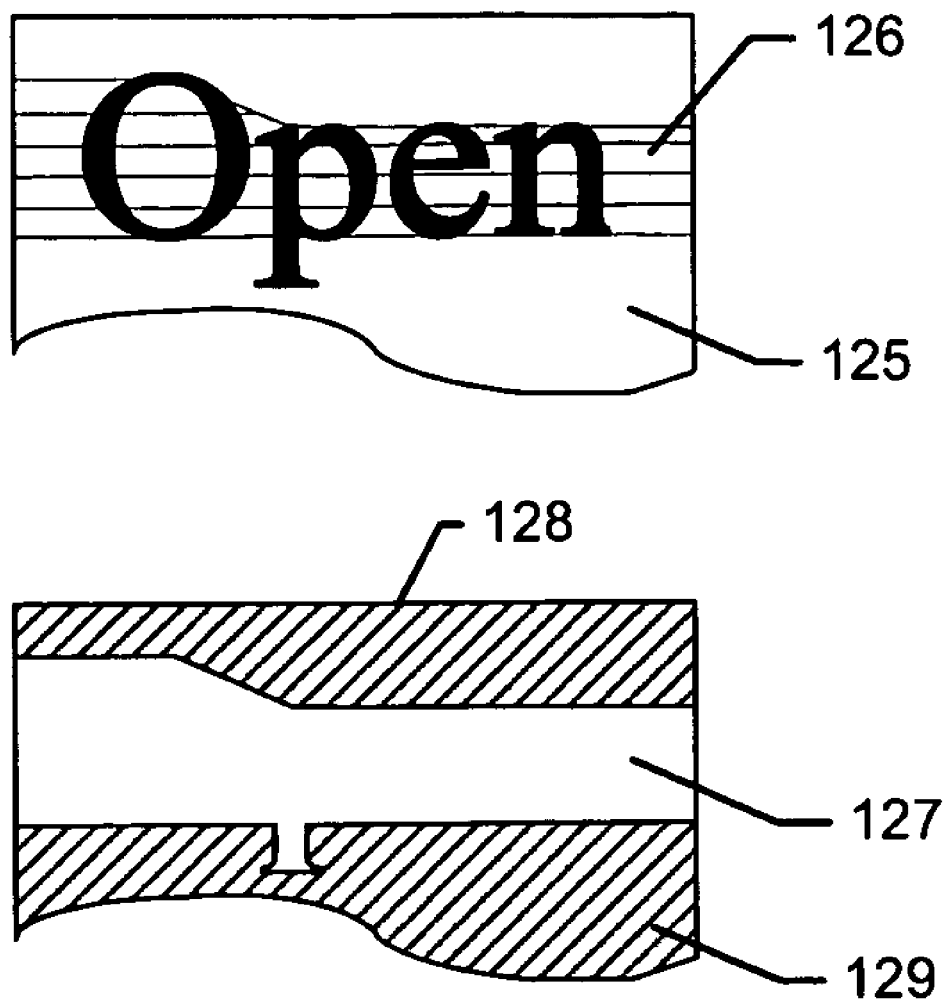
FIG. 5 illustrates a subsection of the background image mask identified by the first pass of the background filter.

FIG. 5 illustrates a subsection of example image 100 as the image is transformed using background identification and mask generation as shown in FIG. 3. Gradient background area 125 is removed from the image where lines of 16 color-matched pixels are identified. However, due to the presence of text and other artifacts, some of gradient area 126 does not have lines of pixels that are 16 pixels long so they are not identified as background pixels. Region 129 on resulting background mask 128 shows the area that has been removed from the image and remaining region 127 indicates where the background has not been removed. This filter process has similar results for constant color background region 101. All regions where lines of 16 pixels of constant color that don't intersect text 102 or object 107 are moved to the background mask.

Text and Object Identification

The next operation in the decomposition of the image is text identification 11. Given that text and high-contrast type 2 objects are identified using the same filters and only classified separately as a later step based on different background characteristics, the following description uses the term "text" to refer to both text and type 2 object image types unless specifically noted otherwise.

The preferred embodiment of the invention uses conservative analysis for text identification based on the underlying requirement for accurate image reproduction. The rationale is that it is useful for text areas to be correctly identified to ensure lossless compression. However, accidental classification of non-text areas as text areas may impact the compression ratio but does not impact image quality.

In accordance with the preferred embodiment, graphical images incorporating lines with 16 pixels of a constant color match the background filter requirements and are decomposed onto the background layer rather than the text layer. This may decrease the overall compression ratio slightly, but both the background and high-contrast features will be reproduced accurately.

Text Filters Overview

Figure 6:
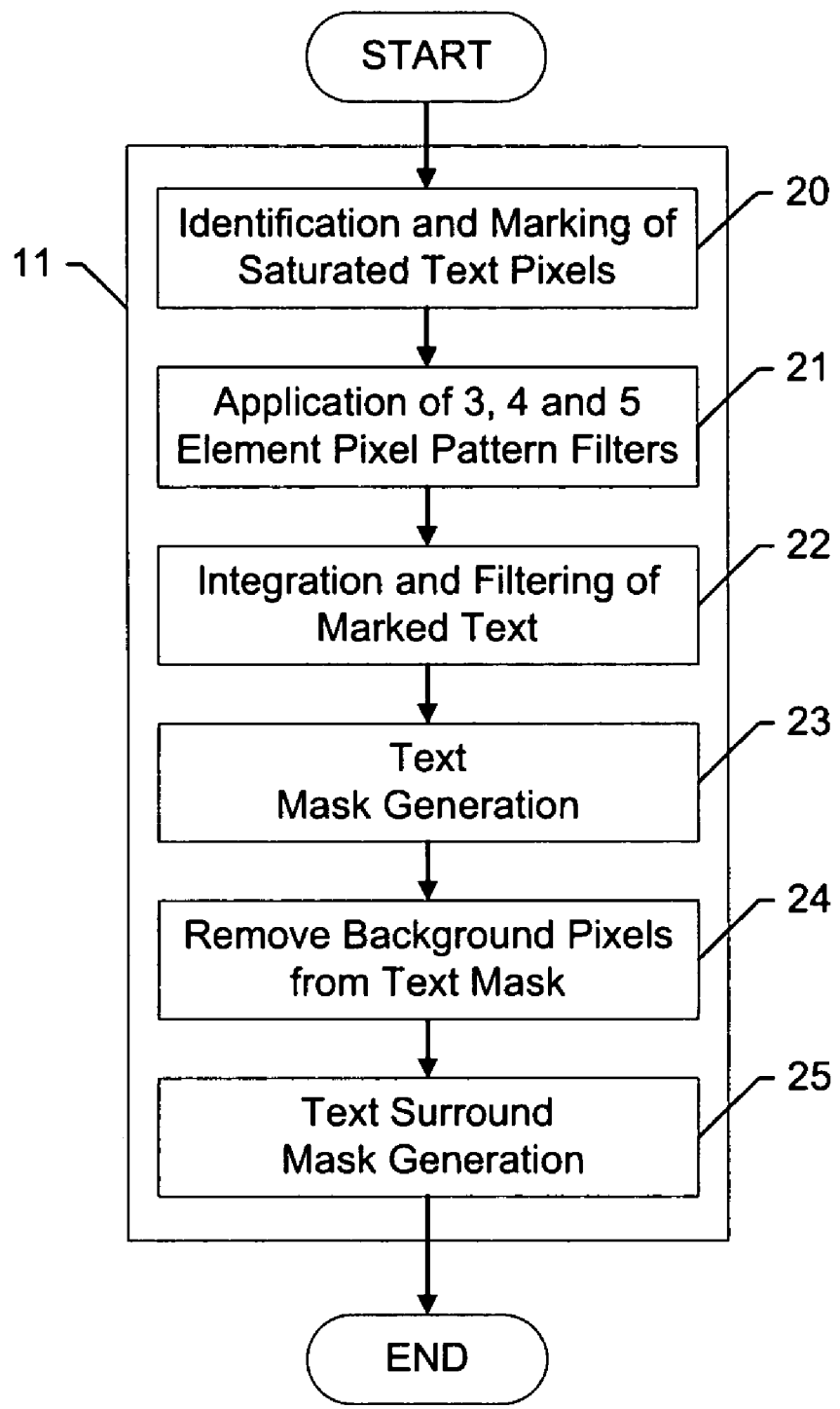
FIG. 6 illustrates in flow chart form the text identification method.

FIG. 6 illustrates a flow chart of the method of the present invention that is used to identify high-contrast text areas. High-contrast areas include text, icons and other high-contrast graphic objects. These parts of the image should be viewed clearly and should therefore be capable of lossless reproduction.

Based on the variety of shapes and forms expected for text, the present invention uses a series of contrast filters in conjunction with an accumulated pixel density integration filter to positively identify text pixels. Each contrast filter is applied to the image and marks are assigned to individual pixels identified as text prospects. Once the image has been processed by the series of contrast filters, the marks for each pixel are accumulated and the image is filtered by the integration filter to select only areas that have a high density of text markings.

Identification and Marking of Saturated Text Pixels

Still referring to FIG. 6, the first filter method used (act 20) for detecting text identifies and marks saturated text pixels. In a 24-bit color space embodiment, a saturated color in RGB space is defined as any color where R, G and B are each 0 or 255, where each RGB color is represented by an 8-bit value. For a grayscale embodiment, these values correspond to the colors black and white. Saturated colors tend to be vivid and are therefore often used in computer display text. Therefore, pixels of saturated color have a high probability of being text. However, the mere presence of saturated color pixels does not guarantee that the pixels are text. The saturated color pixel needs to be adjacent a pixel of contrasting color. The filter seeks saturated color pixels with the additional constraint that each be adjacent to a pixel of reasonably high-contrast. Background pixels are almost always saturated, so an additional constraint is that the pixel should not be a background pixel as determined by the previous filters.

Another filter method involves the identification of pixel regions of various sizes that match, either exactly or within some predefined difference, pre-determined pixel patterns. These pixel patterns are based on the expected color gradient and contour of text. In addition these pixel patterns may include the expected location of background pixels (where a background pixel is a pixel that has been detected by the aforementioned background filter). This embodiment of the invention includes application of multiple pixel pattern filters (act 21) that compare groups of 1×3, 1×4 or 1×5 regions of pixels to determine if they are assigned text pixel markings.

Prospective text pixels receive multiple markings from the multiple pixel pattern filters. Once all of the text filters have been applied, the marks are accumulated and integrated over a small area (act 22). The output of the integration filter is a value that is used to measure if the area has a sufficient density of text marks. If the area passes the threshold, then all text marks in that area of the text mask identify text pixels. If the area does not pass the threshold, then all text markings are considered to be noise and the text marks in that area are removed. Once the text pixel markings determined to indicate noise have been removed, the remaining text pixel markings are converted into a text mask (act 23). Indicia for pixels that are identified as both text and background are also removed from a text mask (act 24).

At this point, the text mask contains both text and high-contrast objects. These high-contrast objects are removed from the text mask by a later filter. Text indication is not a perfect process and not every text pixel is positively identified by the aforementioned pixel patterns. A blocking operation is performed to mark the pixels surrounding text pixels (act 25). This ensures the mask is expanded to include all text pixels. The expanded area is also useful for background identification.

Figure 7:
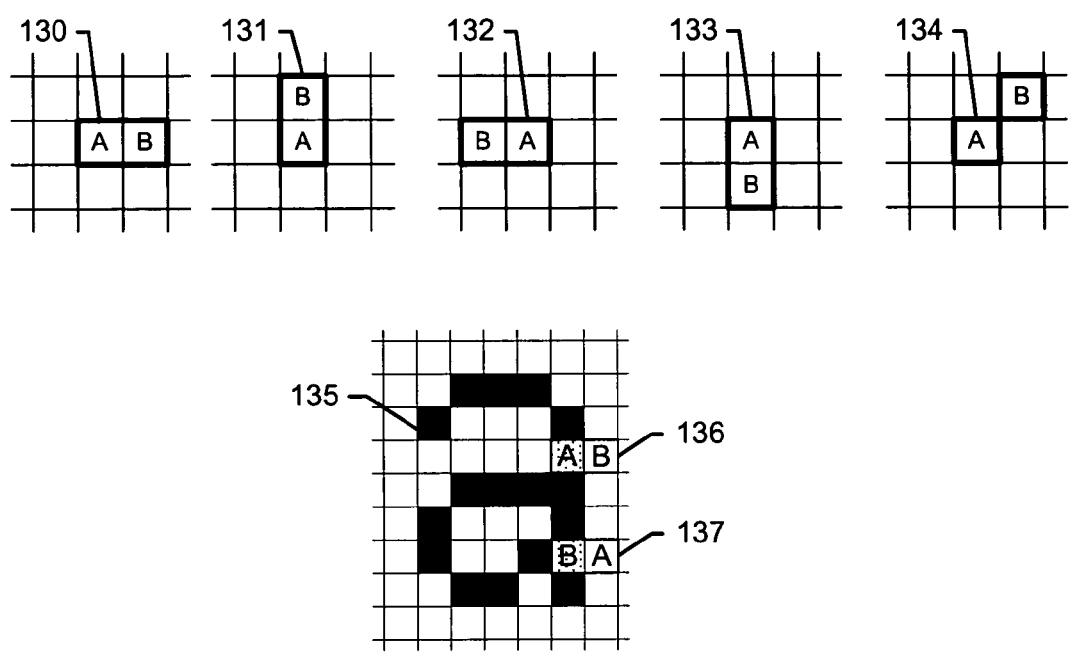
FIG. 7 illustrates a saturated pixel text filter.

FIG. 7 illustrates a saturated pixel filter of the present invention that is used to identify text more accurately than prior solutions. Saturated text identification is valid for computer-generated images that have maintained their original, digitally-specified pixel values whereas images that are scanned or pass through an analog transformation are less likely to be able to use saturated color as a means for identifying text. While some text identification methods in the prior art use a threshold to identify pixels as text, these methods are less effective as the original pixel values are unavailable for a determination of the bit-exact original color.

In the present invention, saturated color is used to mark pixels as potential text areas. The marks are summed and combined with the marks from the pixel pattern filters described below to determine if the pixels should be positively identified as text. One embodiment of the filter operates on an 8-bit grayscale image format where saturated black pixels have a value of 0 while saturated white pixels have a value of 255. This allows the filter to work with both black and white text. The saturated pixel filter requires that a minimum color difference exists between the saturated pixel and an adjacent pixel. Specifically, referring to FIG. 7, pixel A is marked as text according to the formula:

$$|A-B| >= d \quad (2)$$

and $$A = 0xFF \text{ or } 0x00 \quad (3)$$

and A is not a background pixel, where d is the minimum specified color difference.

Pixel B may be to the right 130, left 132, above 131 or below 133 the saturated color pixel A. Although not described in detail in this embodiment, diagonal filters 134 may also be used.

FIG. 7 shows an example of the "a" character as 5×7 pixel array 135. If the character pixels are black (or of value 0) and the background contrast is greater than the minimum required color difference, then both of the pixels are marked as text pixels multiple times. FIG. 7 shows pixel pair 136 in which pixel A will be marked as text according to the formula. To prevent both the text and background pixels from being marked as text in an image where the background is white (or 255 in an 8-bit grayscale image), the filter requires that the saturated pixel is not also a background pixel in order for the text pixel to be identified. For example A is not identified as text in the application of filter 137.

In cases where anti-aliased text is present, the boundaries are not always as sharp as standard, aliased text. Saturated pixels in anti-aliased text are normally adjacent to gray pixels and the color difference between them may not meet the minimum difference requirement. One method to address this problem is an alternative embodiment of the saturated color filter. In this variation, aliased text is detected by measuring the contrast between the saturated pixel A and the pixel B where B is two pixels away from A rather than them being adjacent pixels as described above. In this embodiment, the middle pixel (between pixel A and pixel B) is either not considered at all in the filter equation or the filter coefficient for that pixel has a reduced weighting. For example, a weighted average value may be calculated across the two non-saturated pixels where the weighting for the center pixel is lower than the weighting for the outer pixel. This averaged contrast level is then used to determine if a contrast threshold is exceeded.

In yet another embodiment of the invention, color pixels that are saturated in one or two of the R, G, or B levels are also considered for text identification. However, the probability of false detection increases as the number of saturated colors is reduced from three to two or one. The probability of errors further increases as the filter width increases. In these cases, additional filtering is necessary to remove the unwanted detections. For example, one option is to decrease the contrast threshold between the saturated color pixel and the adjacent pixel that positively identifies the color pixel as text.

1×3 Pixel Pattern Filter

Figure 8:
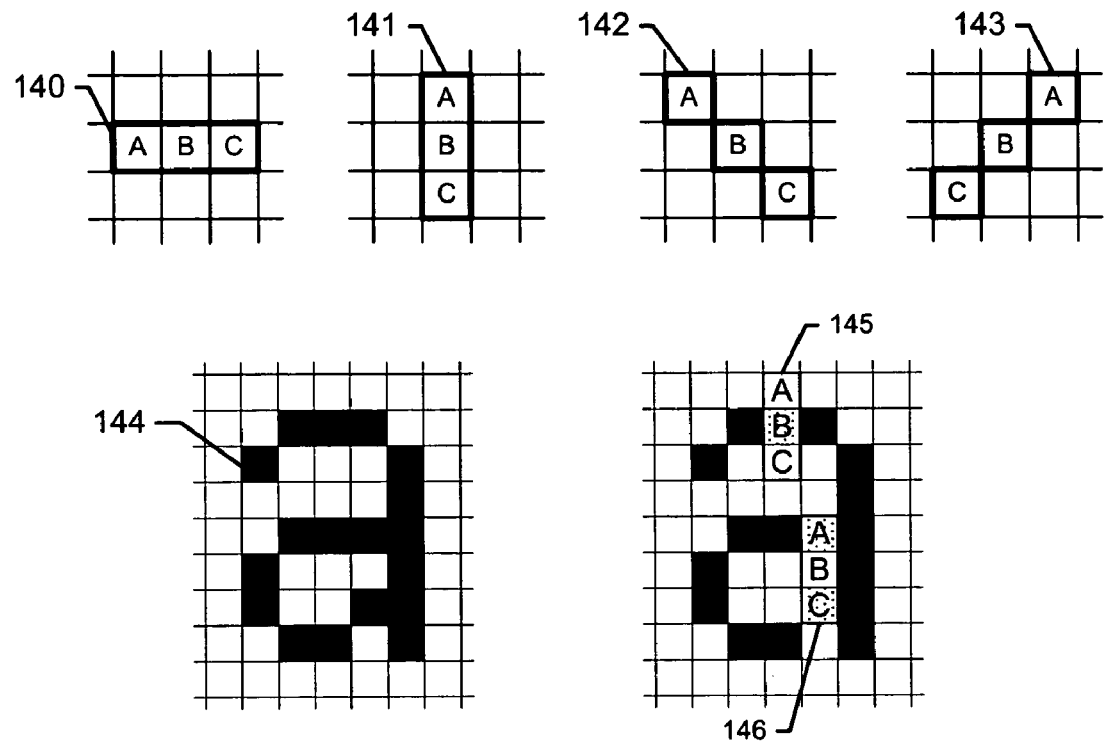
FIG. 8 illustrates a 3-pixel pattern filter.

FIG. 8 is an illustration of a 3-pixel filter that takes advantage of two types of 1×3 pixel patterns that might appear in a noiseless computer display generated image.

The illustration shows the character "a" 144. The first pattern 145 takes into account the fact that the background in a digital image may be precisely constant without any noise and therefore A and C are exactly equal. The second pattern 146 takes into account that pixels contained in the same text character may be exactly equal and therefore A and C are once again equal. Non-digital pictures do not exhibit this characteristic, which may be used as a further identifier of text. By not enforcing a strict match to the pixel pattern this filter can also look for color gradients on either side of a text pixel. As with the saturated pixel filter, the 3-pixel filter may be applied in multiple directions. Since this filter is symmetric only 4 filter direction variations are shown; horizontal 140, vertical 141, and diagonal directions 142 and 143.

The advantage of the 1×3 pixel pattern filter is that text written over a picture may be detected. In cases where text is written over a picture, the picture may not be flat enough to have matching pixels on either side of a text pixel. However text written on top of pictures is usually written with opaque pixels. In such cases, two pixels on the same character or adjacent characters are likely to have the exact same color and can be separated by a picture background that meets the minimum contrast difference requirement.

The filter has two control values for determining if pixel or group of pixels matches this pattern and thus should be marked as text. The first value is the minimum difference between the center pixel and the nearest outside pixel. The second control value is the maximum difference between the two outer pixels. While the minimum difference of the center pixel need not be large if the end pixels are identical, in cases where the maximum allowable difference between the end pixels is increased, the center pixel minimum difference should also be increased to prevent excessive false text markings. An optional parameter for the filter is to use the background information to determine if a pixel is text. Pixels A, B and C are marked as text according to the criteria in the expression below:

$$|A-C| <= \text{maximum difference between the two outside pixels} \quad (4)$$

and $$|A-B| >= \text{minimum difference between center pixel and nearest outside pixel and optionally A and/or B are background pixels} \quad (5)$$

If there are background pixels at both ends of the filter, and the center pixel is not a background pixel, then there is a high probability that the center pixel is a text pixel. If only one end of the filter is an identified background pixel but there is minimal difference between the two ends, then there is a reasonable probability that the text is on a gradient background. In cases where a pixel identified as a background pixel is under filter examination, the other two parameters may be reduced without increased false text detection.

1×4 Pixel Pattern Filter

Figure 9:
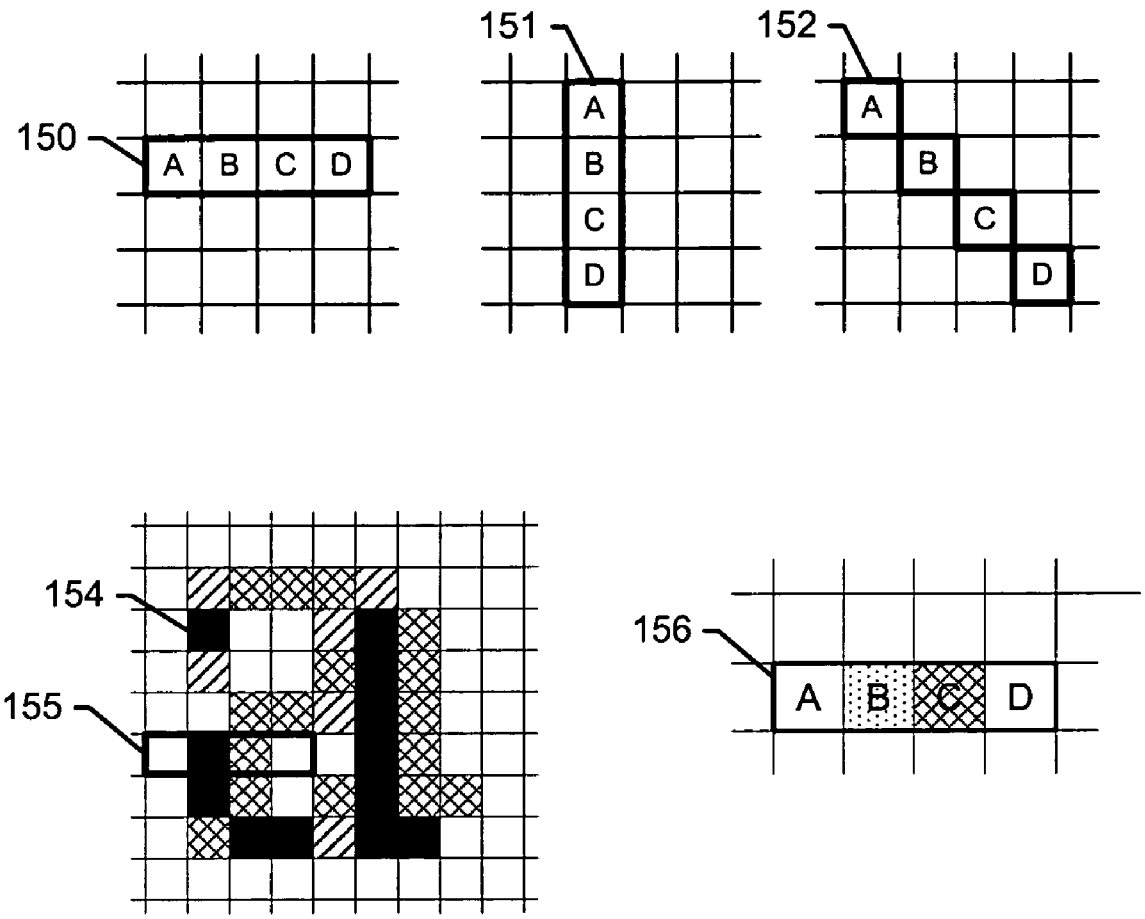
FIG. 9 illustrates a 4-pixel pattern filter.

FIG. 9 is an illustration of a 4-pixel filter. The illustration shows an anti-aliased character "a" 154, with 4-pixel filter 155. The different representations for different pixels in the illustration represent different grayscale levels that comprise the anti-aliased character. This filter is similar to the 3-pixel filter described above and may be applied in multiple orientations 150, 151 and 152. One example of a 1×4 pixel pattern that may be applied is described as follows. Pixels A, B, C and D are marked as text if the following conditions are met:

$$|A-D| <= \text{maximum difference} \quad (6)$$

and $$(|A-B| >= \text{minimum difference or } |C-D| >= \text{minimum difference}) \quad (7)$$

Much like the 1×3 pixel pattern filter described above, 4-pixel filter 155 leverages the fact that the background in a digital image may be precisely constant without any noise i.e. pixels $|A-D| <=$ maximum difference as the filter covers adjacent text pixels B and C on background pixels A and D 156. Filter 155 also leverages other characteristics of text. For example, for readability purposes text pixels are surrounded by pixels of high-contrast e.g. $|A-B| >=$ minimum difference or $|C-D| >=$ minimum difference.

A 1×4 pixel pattern that takes into account that pixels in the same text character may be exactly equal is described below. Pixels A, B, C and D are marked as text using the middle pixels according to the expression:

$$|B-C| <= \text{maximum difference} \tag{8}$$

and $$|A-B| >= \text{minimum difference} \tag{9}$$

and $$|C-D| >= \text{minimum difference} \tag{10}$$

The primary enhancement of the 1×4 pixel pattern filter over the 1×3 filter is that the 1×4 pixel patterns may be applied to detect larger font over a wider area of flat text. In addition, some pixel patterns associated with small fonts can only be properly expressed by a 1×4 pixel pattern.

A variation on the 4-pixel filter embodiment uses background pixel information to improve the search in a similar mode to the 1×3 pattern filter.

1×5 Pixel Pattern Filter

A 1×5-pixel pattern embodiment is also useful for detecting wider text. While the simple n×m pixel pattern recognition works well for small values of n and m, as the pixel pattern increases in size, it loses its suitability to capturing generic text characteristics. In fact, the filter embodiment becomes better suited to more computationally intensive character recognition applications.

Given that the pixel size of text in a computer display is typically limited, the 3-, 4-, and 5-pixel filters described work well for computer displays and provide significant processing and identification improvement over alternative filtering methods. Moreover, the simple pixel comparison method is suitable for the real-time decomposition of a computer display.

Pixel Pattern Filter Results

Figure 10:
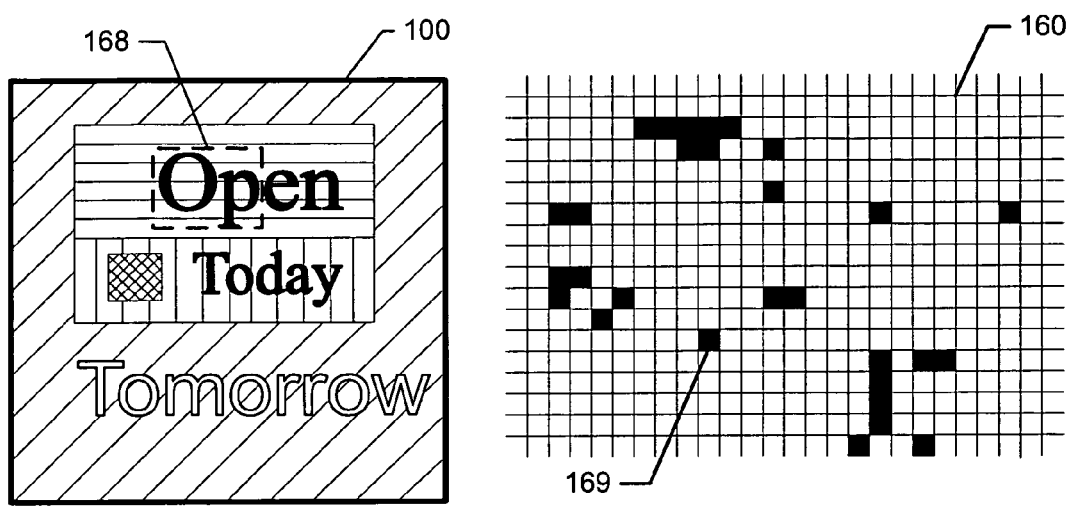
FIG. 10 illustrates a subsection of the text image mask identified by the saturated pixel filter and pixel pattern filters.
Figure 10:
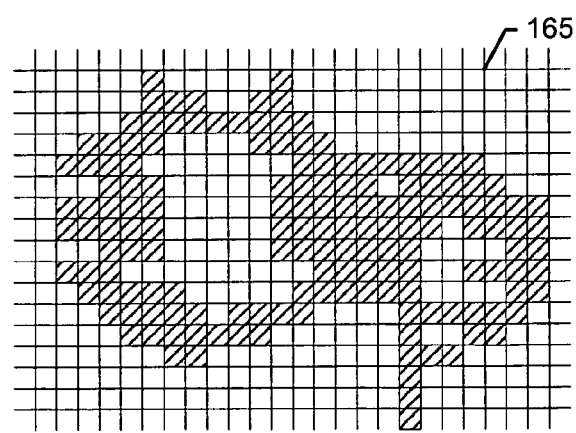

FIG. 10 shows area 168 of original image 100 after the text filters have been applied. Pixels that are marked are illustrated as pixel marks on pixel map 165 while those that have not been detected by any of the text filters are shown as pixels 169 on pixel map 160.

The text filtering process results in numerous text markings in areas of high text density, a few markings in areas where text appears over a picture and infrequent markings in other regions of the image, for example regions where a picture has localized areas of high contrast.

Pixel map 165 shows the filtered pixel data for pixels that have accumulated at least one positive marking. As discussed previously, text pixels will typically have multiple markings because each text pixel may be detected by multiple filters (for example, a saturated color filter on one or more pixel pattern filters) whereas textured background pixels will have no markings or only a few markings as a result of occasional erroneous text detections.

Next, accumulated text markings provided by the text filters are filtered to evaluate the text mark density and remove erroneous text detections. If the number of text marks over a small area exceeds a defined threshold, the text pixels in that area remain marked as text pixels. In different embodiments, the weighting of text marks and the text density threshold may be varied in different areas of the image. Nevertheless, depending on how the text markings are accumulated and the defined threshold value, some false text indications may result, especially in areas where text is drawn over textured image 105.

Figure 11:
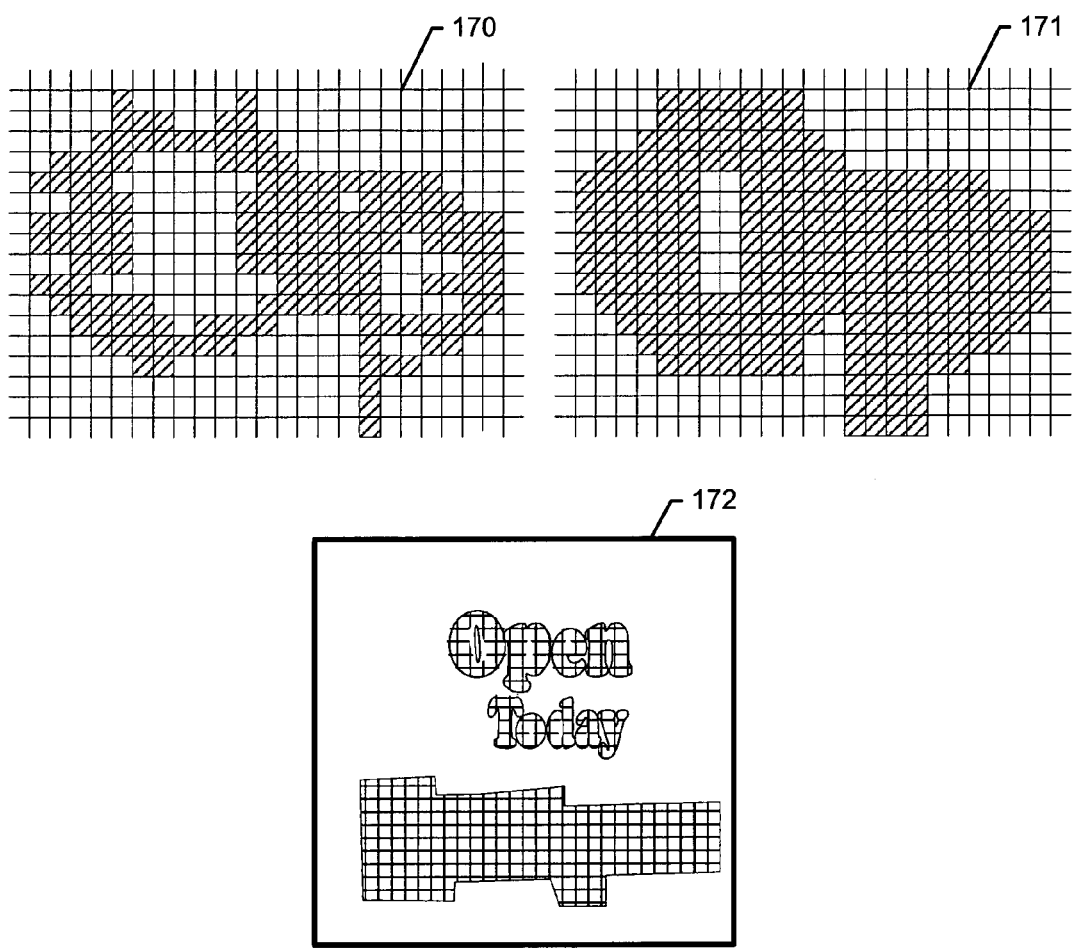
FIG. 11 illustrates a subsection of the text image mask after it has been filtered for text mark density and the text mask has been expanded.

FIG. 11 shows the results of text surround mask generation process 25 in area 168.

After the text is filtered (act 22), the text mask is generated at act 23. FIG. 11 shows text mask 170 for area 168. As described earlier, the process also includes the removal of text pixels located over background pixels (act 24). The text mask is then expanded around every text pixel (act 25) and results in expanded text pixel mask 172, of which pixel subsection 171 for area 168 is shown. Although extra pixels may be captured in the process, this ensures that all of the text over a picture background area will be accurately reproduced when decompressed. Additionally, expansion of the text over the background aids more precise identification of the background itself as shown in the next decomposition operation. At this point the text mask contains text and high-contrast objects.

Background Expansion

Figure 12:
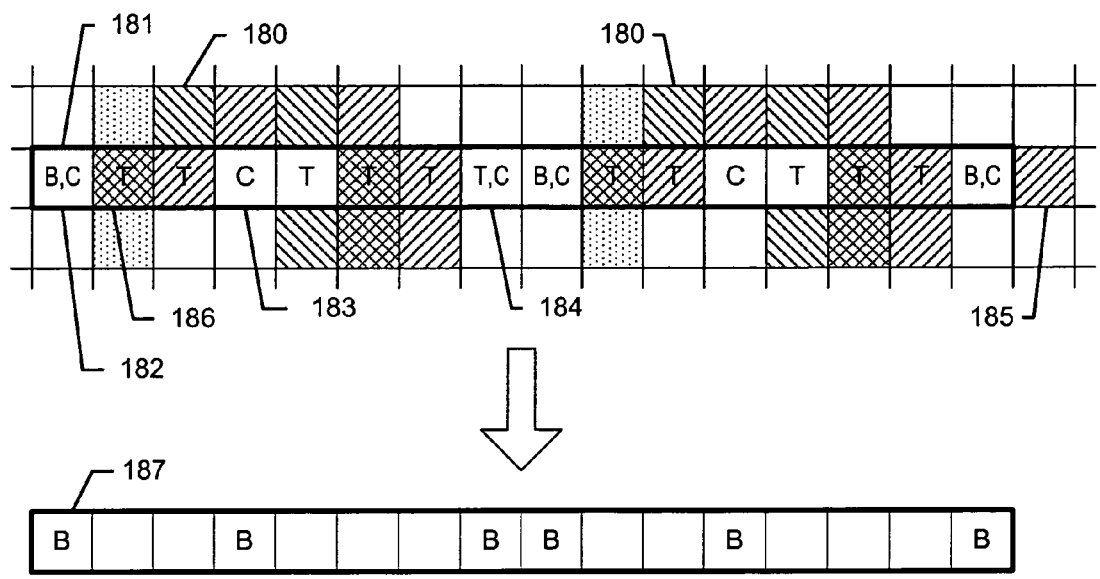
FIG. 12 illustrates a background filter used to expand the background mask by identifying background pixels enclosed by text marked pixels.

FIG. 12 illustrates background expansion and mask update process 12. In this preferred embodiment, a background modification filter evaluates line 181 of 16 pixels. In the example illustrated, the top part of two anti-aliased "a" characters is shown at reference numeral 180.

For every pixel that is marked as a background pixel, the filter analyzes the next 16 pixels. While the embodiment shows the next 16 pixels to the right of background pixel 182 under analysis, the filter may be applied to the right, above, below or diagonally. The pixels are assigned various markings identified by the letters T, B and C, depending on specific attributes. Pixels have been identified as text pixels in the text mask are marked with a T (reference numeral 186). Pixels have been previously identified as background pixels are marked with a B. Pixels that exactly match the color of pixel 182 are marked with a C to indicate the color matching criterion. C pixels 183 and 184 are potentially background pixels and are therefore subject to further evaluation.

Pixels that are marked only as text 186 are ignored as these represent the text over the background. If pixels are marked with both T and C, they have been incorrectly identified as text, probably as a result of expanding the text mask. These pixels are candidates for background pixels.

If a pre-defined number of C and T pixels are found, then all potential background pixels are added to the background mask as indicated by line of pixels 187.

The effect of the filter is that background inside of text is marked. For example, the area inside of the letter "O" is marked as background as a result of this process.

In the case of a gradient background, the gradient lines run orthogonal to the direction of constant color. If the filter described in this embodiment is applied both horizontally and vertically, it will also successfully detect and mark the gradient background around the text.

Figure 13:
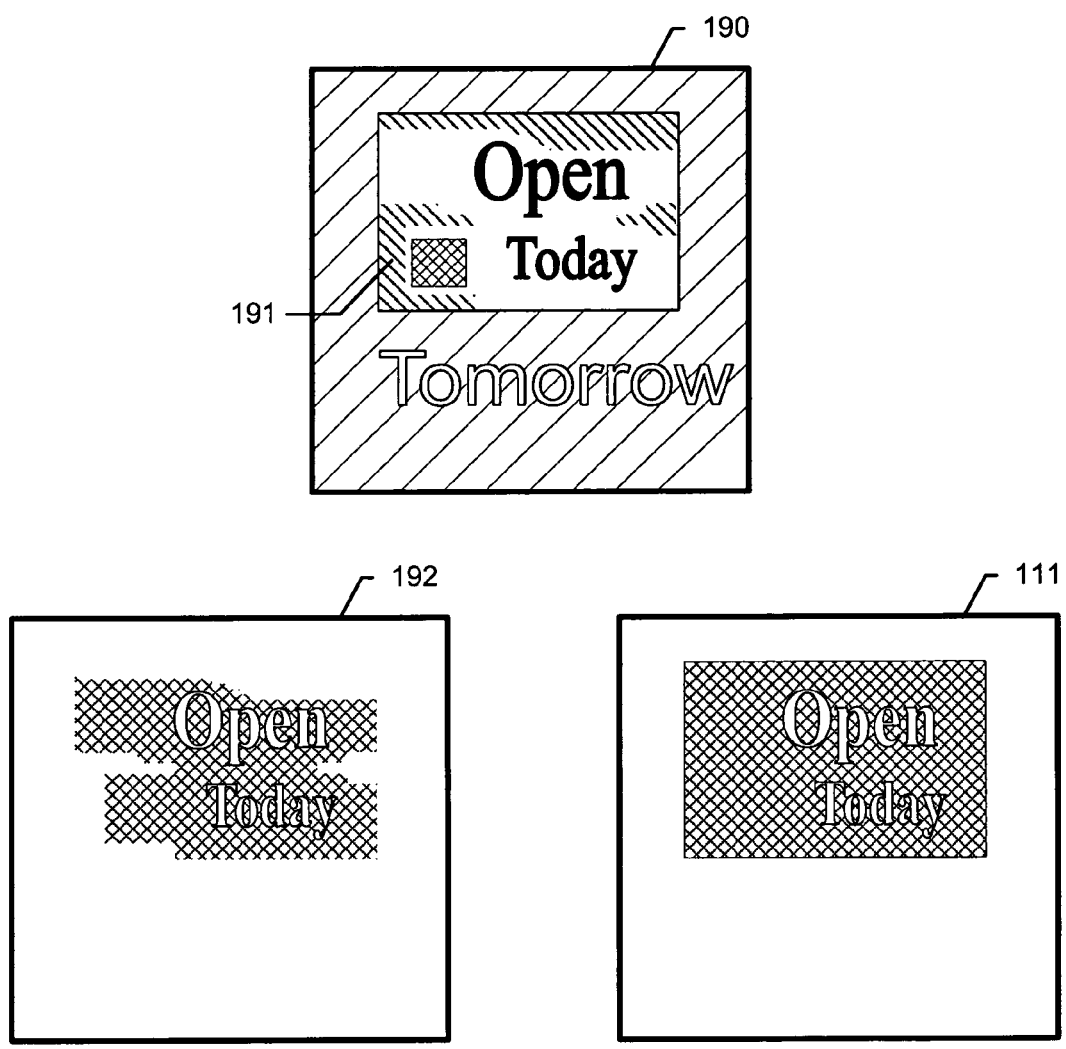
FIG. 13 illustrates the background image detected by the modified background filter.

FIG. 13 represents image 190 with areas of background 191 that have been detected and removed by the background modification filter. The resulting update lines 192 generated by the background modification filter are added to the initial background mask creating completed background mask 111.

Figure 14:
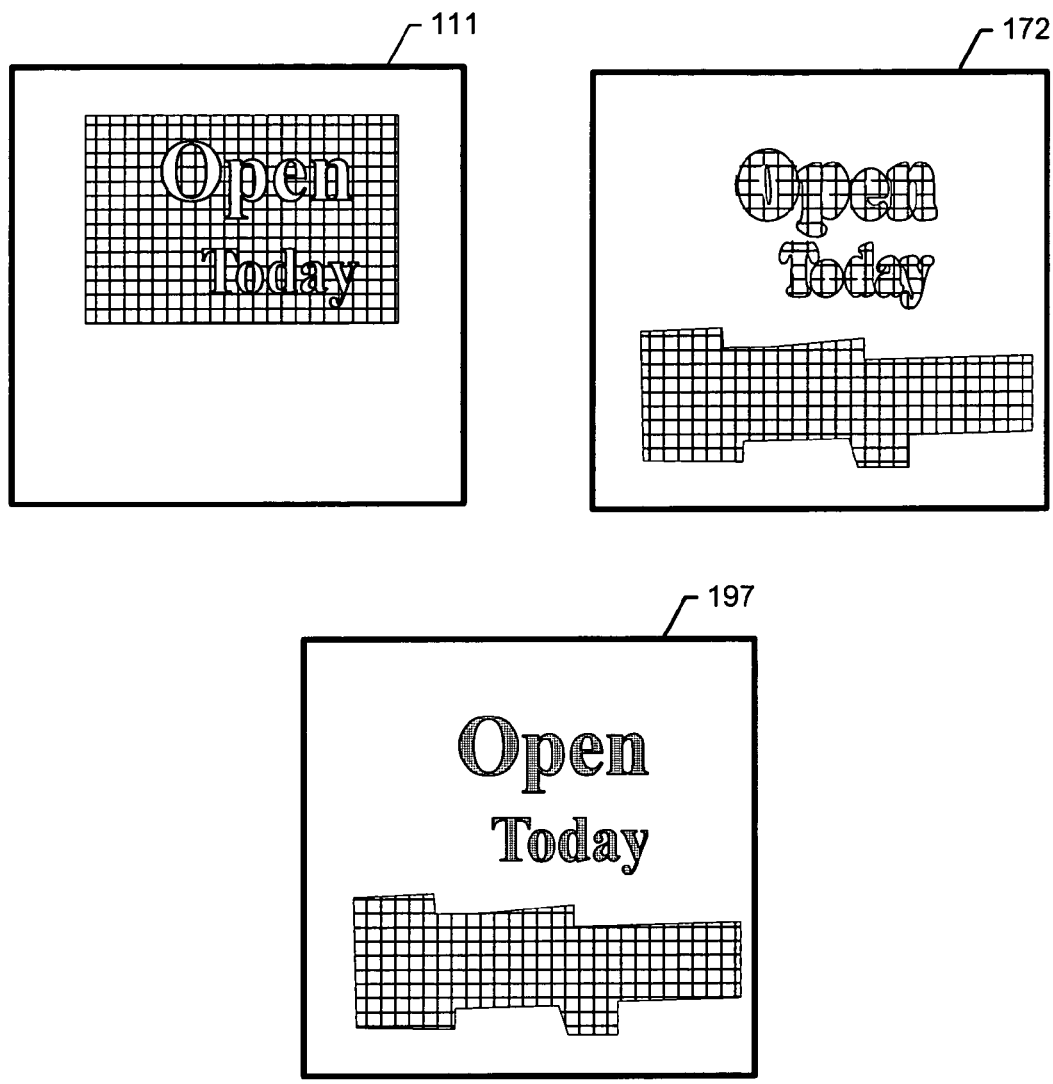
FIG. 14 illustrates the generation of the clean text mask by removing the expanded text markings that conflict with the background mask.

FIG. 14 shows an example of background mask 111 that is applied to completely expanded text mask 172 to generate clean, text-only mask 197 in text expansion and mask update (act 13). Text mask 197 still contains both text and high-contrast type 2 objects.

Enclosed Artifact Detection

The text filters detect text image types but do not detect small areas that are smooth or have low contrast, for example a low contrast icon overlaid on a background. Enclosed object additions (act 14) add these artifacts as type 1 objects to the text mask so that they can be accurately reproduced.

Figure 15:
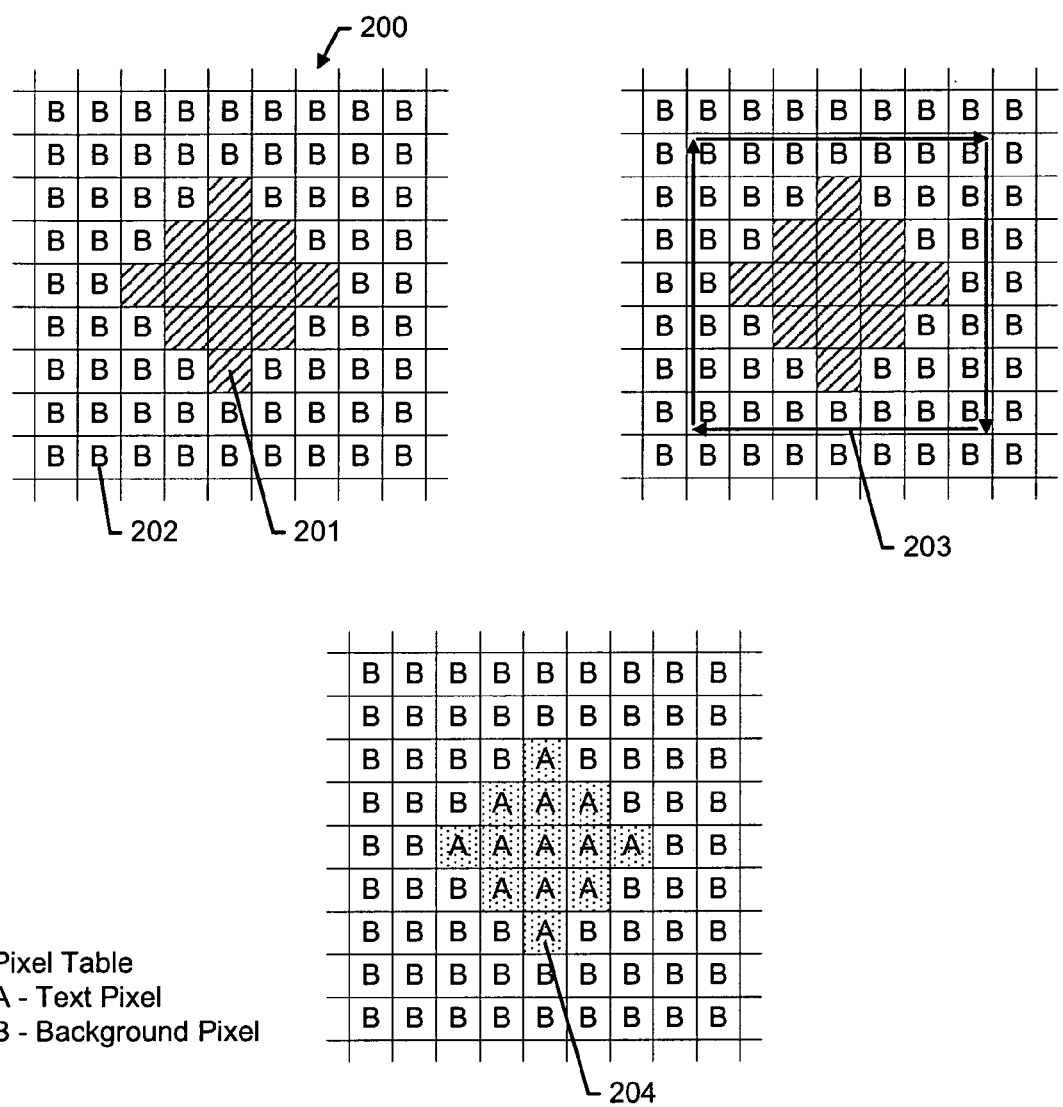
FIG. 15 illustrates a non-text object surrounded by background pixels that is detected as a low-contrast object.

FIG. 15 is an illustration of the enclosed artifact search method. An area of image 200, which has pixels that have not been identified as text or background 201 is surrounded by pixels that are identified as background pixels B 202. The process searches for a series of connected background pixels that can create box 203 around the unmarked pixels. If the size of the box is within a defined area, the unmarked pixels are marked as object pixels A 204. If the box exceeds the defined area, it is likely a picture on a page and the pixels are left unmarked. These and other unmarked pixels are classified as picture pixels at the end of the identification sequence. The addition of the enclosed objects to the text mask may improve the background expansion and mask update act 12. For example, in the case of an enclosed object that bisects a horizontal line of one color into two shorter lines. Once the enclosed object is removed, the two lines may be joined by the method to form a single line. The resulting single line is more efficiently compressed.

Separation of Text and Objects

Figure 16:
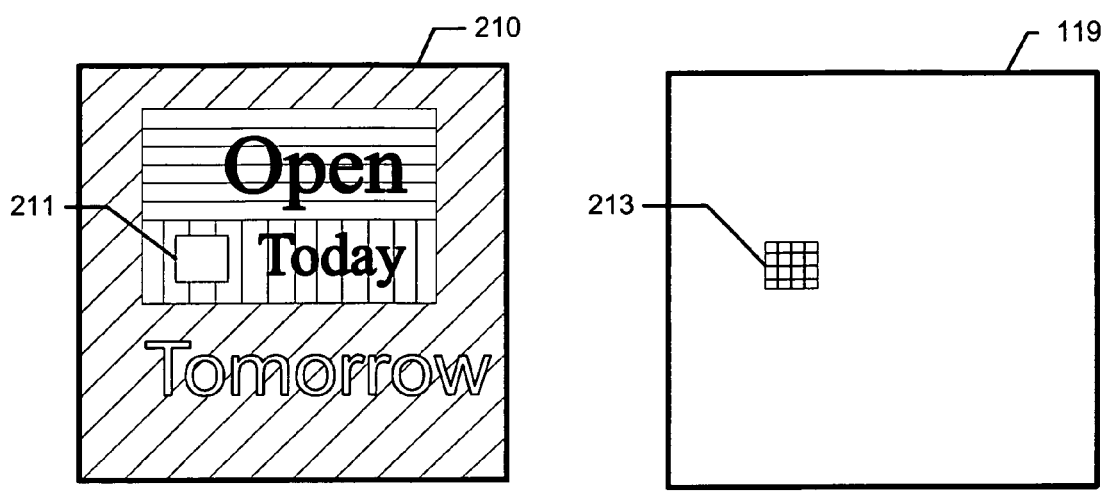
FIG. 16 illustrates the generation of an object mask containing the non-text artifacts.

Next, at act 15, unidentified low contrast artifacts are separated from text and moved to the object mask as type 1 objects. FIG. 16 is an illustration of image 210 with undefined artifact 211 removed and added as object 213 on object mask 119 in accordance with act 15.

Figure 17:
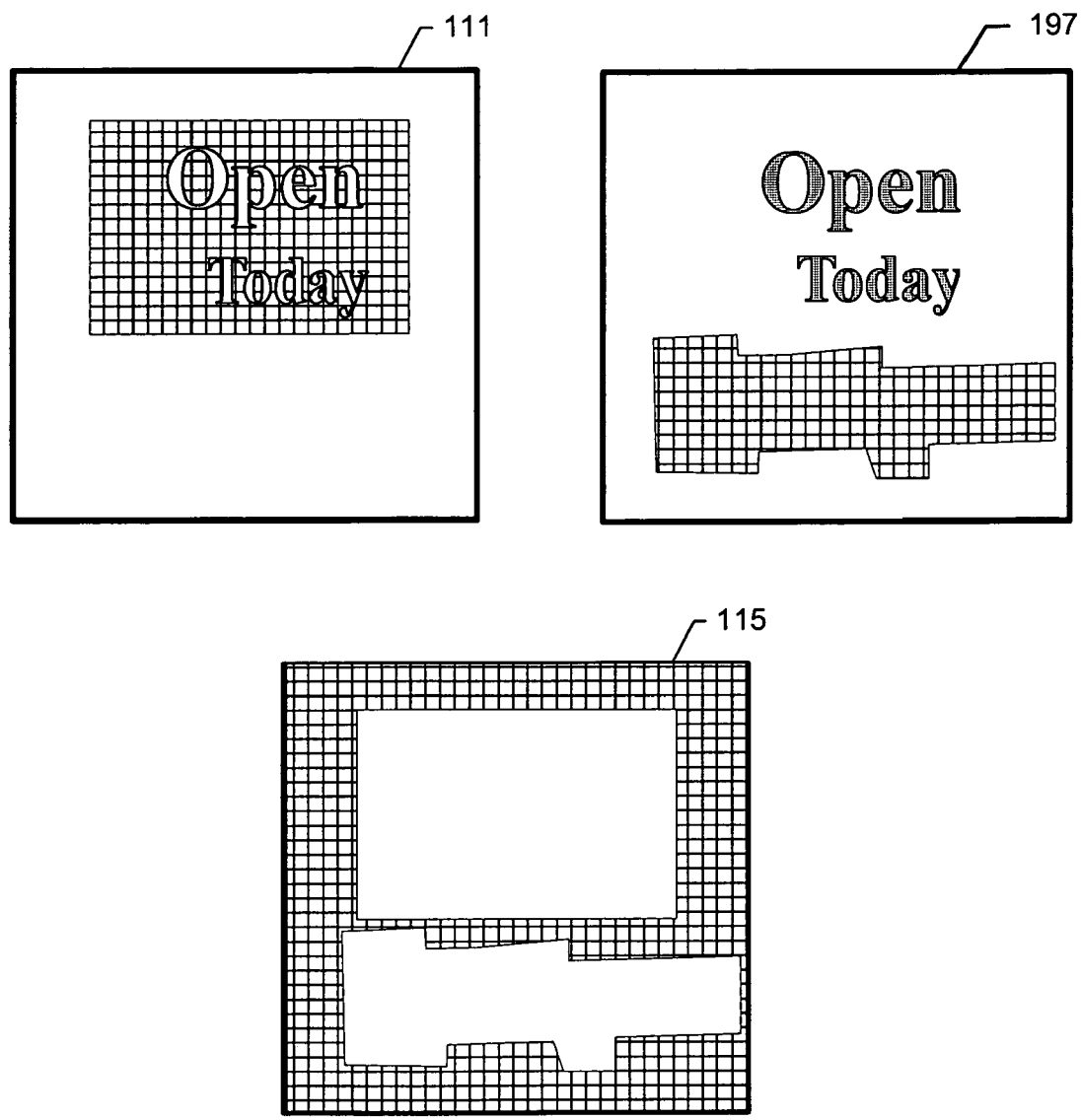
FIG. 17 illustrates the generation of the picture mask that is generated by identifying all of the pixels that are neither text nor background.

At act 16, the picture mask is generated. FIG. 17 illustrates background mask 111 combined with text mask 197 to identify the unmarked pixels. The unmarked pixels are used to generate picture mask 115.

Because each act in the identification process makes use of pixel markings generated in previous steps, the identification process may be repeated to improve the decomposition as illustrated in iterative, top-level act 18.

Figure 18:
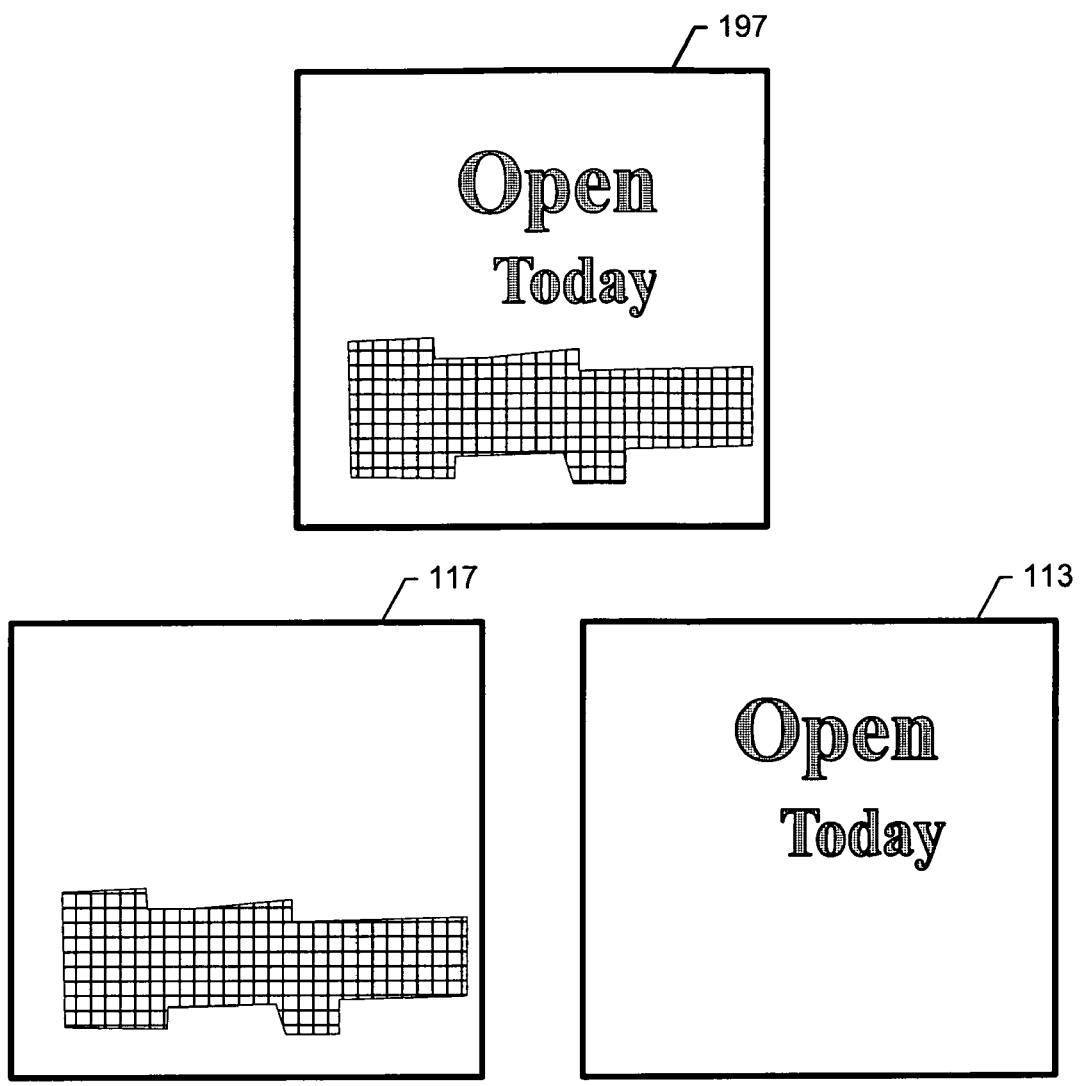
FIG. 18 illustrates the separation of the text mask from the high-contrast object mask based on the different background characteristics of text and high-contrast objects.

Next, as shown in FIG. 18, high-contrast type 2 objects are moved to the object layer. Text pixels that are at least partially surrounded by pictures are removed from text mask 197 and type 2 object mask 117 is generated. Text pixels that are completely surrounded by background pixels remain on text mask 113.

Figure 19:
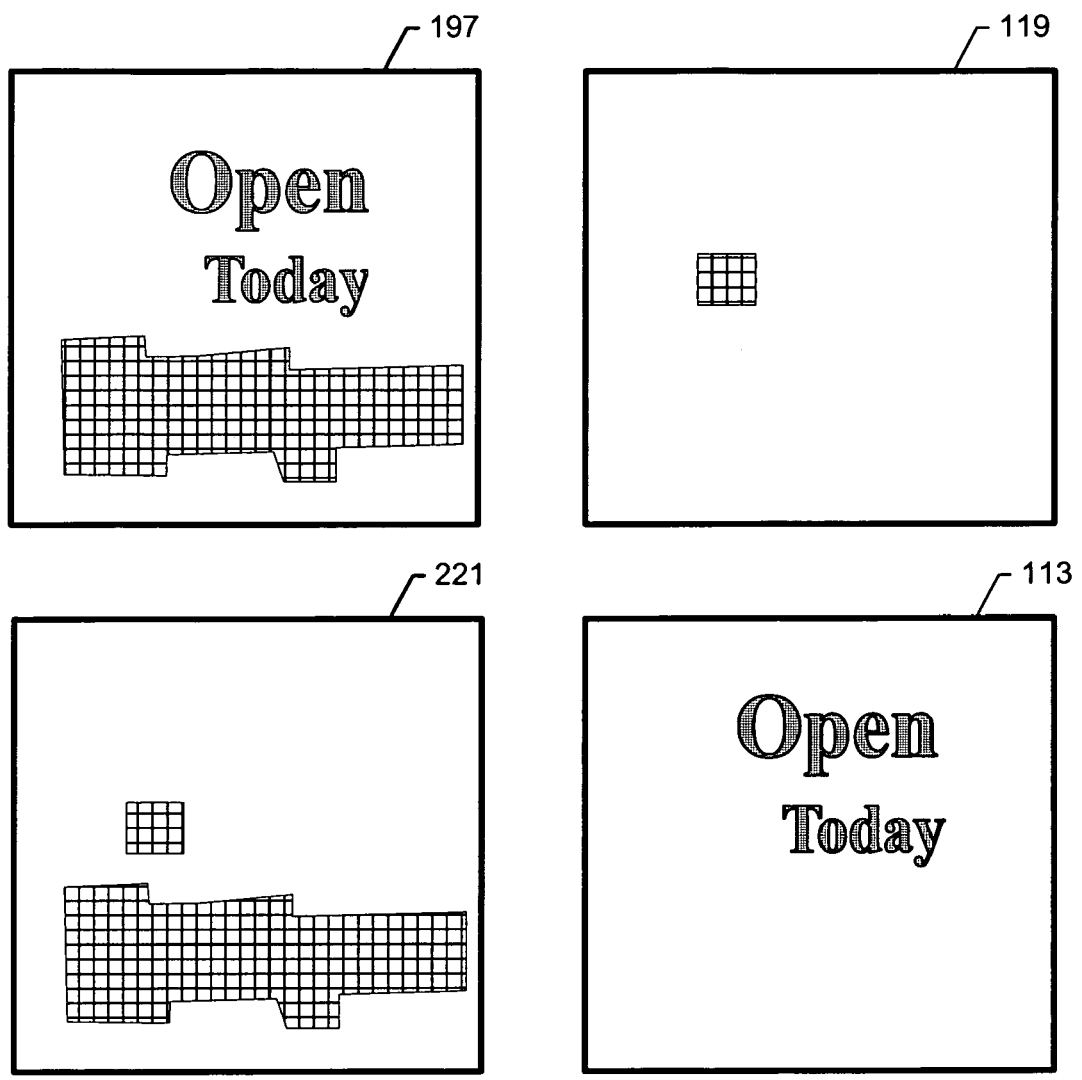
FIG. 19 illustrates a variation on the object mask set that combines the different object types onto a single mask.

A variation on this embodiment is shown in FIG. 19, where the type 2 objects on text mask 197 are added to object mask 119 (that already contains low-contrast objects detected in the encircling filter) to form combined object mask 221 rather than two separate object masks. Separating the objects into multiple masks provides further opportunities to optimize the compression techniques.

Filter Mask Updates

Finally, small areas of image types may be filtered at act 17 once the masks have been created. This filter reclassifies small areas of one image type based on the type of adjacent pixels in order to improve the compression ratio of the image. A first filter method changes small areas of background pixels that are surrounded by text pixels to text pixels. The reason this is more efficient is that background image types compress well if they define a large area, but the text compression algorithms may be better at handling small groups of pixels. A second filter method changes small groups of background pixels that are surrounded by picture pixels to picture pixels because these areas are likely a flat area of the picture. A third filter method converts small groups of picture pixels surrounded by background or text pixels to text pixels using methods similar to the enclosed artifact detection of act 14.

RGB Embodiment

The above decomposition method has been described using a grayscale image embodiment for the purpose of providing simple descriptions. Another preferred embodiment of the present invention uses an RGB computer display image. In this case, every color may be individually tested using the same methods described above. The text filters used in these color applications may select the number of colors required in order to satisfy the positive text identification criteria.

Color Space Translation

In a further embodiment, color space translation may be used to improve or simplify the decomposition methods. However, the image should be compressed as an RGB format or using another lossless translation to ensure accurate reproduction of the image.

Decompression and Recomposition

The compressed image and masks are received by the remote client as a data stream described above. While the present invention can be used with conventional computers configured in networked environments, the present invention is particularly useful for thin clients that have limited bandwidth capabilities or limited processing resources, such as portable computers, wireless devices such as cellular telephones, palm-top computers, and the like. In the preferred embodiment, the data stream is a serial stream comprised of a header, a sequence of four mask information fields (for the text, background, object and picture masks) followed by the compressed image data for a specified geometry of image pixels. In the preferred embodiment, each sequence of four mask information fields is used to describe a compressed block area of 16×16 pixels. In alternative embodiments, the blocks may be of other dimensions, including larger blocks, lines or entire frames.

The remote client is familiar with the organization of the data stream and has the ability to extract the mask information from the mask information fields and decode the image based on this information to reconstruct the original image frame. The remote client maintains the algorithms necessary to decompress the image data using the methods identified by the mask information. Depending on the graphic content of the display, different decompression techniques may be used, such as Run-Length Encoding (RLE), Lempel Ziv Walsh (LZW) encoding, Joint Photographic Experts Group (JPEG) decompression, Motion Picture Experts Group (MPEG) decompression, or other published or proprietary lossless or lossy compression methods. Depending on the compression method used, the compressed display stream may be decompressed on a per block basis, across multiple blocks (e.g. LZW, JPEG), or across frame updates (e.g. MPEG).

The decompression apparatus located on the remote client uses the received mask set to enable the image decompression and reconstruction methods. In the preferred embodiment, background and picture layers are decompressed and reconstructed before the text and object layers. In the case of the background mask, the mask provides the co-ordinates for the start and end co-ordinates of graphic descriptors or the predictive background decoder in an alternative embodiment. Alternatively, the descriptors themselves may define the background co-ordinates.

In the preferred embodiment, the remote client uses the received picture mask to identify the co-ordinates and boundaries of the picture areas once they have been decompressed.

The object mask identifies the exact location of object pixels in the original image although the mask does not specify the object texture. Objects are decompressed and the pixels are populated over the background of the reconstructed image using the co-ordinate positions provided by the mask.

In the case of anti-aliased text, the text mask defines the boundaries of the text. Texture detail is derived through a lossless decoding method used for the text layer text. In the case of simple, fine text, the text mask provides an accurate specification of the form and texture of the text. For example, in the case of simple single color text, accurate text reconstruction is accomplished by populating the locations of the image specified by the text mask with the pixels matching the color specified by the text layer.

While a method and apparatus for generating masks for a multi-layer image decomposition have been described and illustrated in detail, it is to be understood that many modifications can be made to the various embodiments of the present invention without departing from the spirit thereof.

What is claimed is:

1. A method of transforming a digital image into at least one discrete packet for transmission to a remote client, the method executed under the control of a processor configured with computer executable instructions, comprising:
   obtaining, from a digital source, the digital image;
   initializing a first pixel map to identify essentially all contiguous sets of pixels from the digital image that have a defined color matching tolerance and exceeding a pixel count threshold;
   determining a mark count for each pixel of the digital image, each mark of the mark count indicating a contrast detection by one of a plurality of contrast filters;
   determining a mark density for the each pixel of the digital image that exceeds a threshold of the mark count, the mark density indicating an accumulation of the mark counts from pixels of the digital image within a defined area including the each pixel of the digital image;
   initializing a second pixel map to identify pixels of the digital image that exceed a threshold of the mark density;
   updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;
   updating the second pixel map to identify a plurality of additional pixels from the digital image, each pixel in the plurality of additional pixels adjacent to a pixel identified by the second pixel map;
   updating the second pixel map by removing identifications of pixels also identified by the first pixel map;
   generating a third pixel map identifying substantially all pixels of the digital image identified by neither the first pixel map nor the second pixel map;
   compressing pixel data identified by the first pixel map by a first compression method;
   compressing pixel data identified by the second pixel map by a second compression method;
   compressing pixel data identified by the third pixel map by a third compression method; and
   constructing the at least one discrete packet comprising the pixel data compressed by the first, second and third compression methods, and the first, second and third pixel maps, wherein:
   the plurality of contrast filters comprises a saturation filter; and
   the indicating the contrast detection by one from the plurality of contrast filters comprises:
   the saturation filter identifying a saturated pixel in the digital image, the saturated pixel not identified by the first pixel map, the saturated pixel having a first value of a value range for one of the group of colors consisting of red color, green color and blue color, the first value comprising one of a minimum of the value range or a maximum of the value range;
   the saturation filter identifying a second pixel adjacent to the saturated pixel, the second pixel having a second value for the one of the group of colors consisting of red color, green color and blue color, the second value exceeding a threshold difference from the first value.

2. A method of transforming a digital image into at least one discrete packet for transmission to a remote client, the method executed under the control of a processor configured with computer executable instructions, comprising:
   obtaining, from a digital source, the digital image;
   initializing a first pixel map to identify essentially all contiguous sets of pixels from the digital image that have a defined color matching tolerance and exceeding a pixel count threshold;
   determining a mark count for each pixel of the digital image, each mark of the mark count indicating a contrast detection by one of a plurality of contrast filters;
   determining a mark density for the each pixel of the digital image that exceeds a threshold of the mark count, the mark density indicating an accumulation of the mark counts from pixels of the digital image within a defined area including the each pixel of the digital image;
   initializing a second pixel map to identify pixels of the digital image that exceed a threshold of the mark density;
   updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;
   updating the second pixel map to identify a plurality of additional pixels from the digital image, each pixel in the plurality of additional pixels adjacent to a pixel identified by the second pixel map;
   updating the second pixel map by removing identifications of pixels also identified by the first pixel map;
   generating a third pixel map identifying substantially all pixels of the digital image identified by neither the first pixel map nor the second pixel map;
   compressing pixel data identified by the first pixel map by a first compression method;
   compressing pixel data identified by the second pixel map by a second compression method;
   compressing pixel data identified by the third pixel map by a third compression method; and
   constructing the at least one discrete packet comprising the pixel data compressed by the first, second and third compression methods, and the first, second and third pixel maps, wherein:
   each pixel of the digital image comprises a plurality of values for primary colors in a color space;
   the plurality of contrast filters comprise a saturation filter; and indicating the contrast detection by one from the plurality of contrast filters comprises:

the saturation filter identifying a saturated pixel in the digital image, the saturated pixel not identified by the first pixel map, the saturated pixel having a first value of a first value range for a first one from the group of colors consisting of red color, green color and blue color, the first value comprising one of a minimum of the first value range or a maximum of the first value range, the saturated pixel having a second value of a second value range for a second one from one of the group of colors consisting of red color, green color and blue color, the second value comprising one of a minimum of the second value range or a maximum of the second value range; and the saturation filter identifying a straight line of pixels comprising a second pixel adjacent to the saturated pixel and a third pixel adjacent to the second pixel, the third pixel having a third value of the first value range for the first one of group of colors consisting of red color, green color and blue color, the third value exceeding a threshold difference from the first value.

3. A method of transforming a digital image into at least one discrete packet for transmission to a remote client, the method executed under the control of a processor configured with computer executable instructions, comprising:

obtaining, from a digital source, the digital image;

initializing a first pixel map to identify essentially all contiguous sets of pixels from the digital image that have a defined color matching tolerance and exceeding a pixel count threshold;

determining a mark count for each pixel of the digital image, each mark of the mark count indicating a contrast detection by one of a plurality of contrast filters;

determining a mark density for the each pixel of the digital image that exceeds a threshold of the mark count, the mark density indicating an accumulation of the mark counts from pixels of the digital image within a defined area including the each pixel of the digital image;

initializing a second pixel map to identify pixels of the digital image that exceed a threshold of the mark density;

updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;

updating the second pixel map to identify a plurality of additional pixels from the digital image, each pixel in the plurality of additional pixels adjacent to a pixel identified by the second pixel map;

updating the second pixel map by removing identifications of pixels also identified by the first pixel map;

generating a third pixel map identifying substantially all pixels of the digital image identified by neither the first pixel map nor the second pixel map;

compressing pixel data identified by the first pixel map by a first compression method;

compressing pixel data identified by the second pixel map by a second compression method;

compressing pixel data identified by the third pixel map by a third compression method; and constructing the at least one discrete packet comprising the pixel data compressed by the first, second and third compression methods, and the first, second and third pixel maps, wherein—indicating the contrast detection by one from the plurality of contrast filters comprises:

a first pixel pattern filter identifying three adjacent in-line pixels comprising a first end pixel, a middle pixel and a second end pixel;

the first pixel pattern filter identifying less than a first threshold difference in color between the first end pixel and the second end pixel;

the first pixel pattern filter identifying at least a second threshold difference in color between the middle pixel and the first end pixel; and the first pixel pattern filter indicating the contrast detection for each of the first end pixel, the middle pixel and the second end pixel.

4. A method of transforming a digital image into at least one discrete packet for transmission to a remote client, the method executed under the control of a processor configured with computer executable instructions, comprising:

obtaining, from a digital source, the digital image;

initializing a first pixel map to identify essentially all contiguous sets of pixels from the digital image that have a defined color matching tolerance and exceeding a pixel count threshold;

determining a mark count for each pixel of the digital image, each mark of the mark count indicating a contrast detection by one of a plurality of contrast filters;

determining a mark density for the each pixel of the digital image that exceeds a threshold of the mark count, the mark density indicating an accumulation of the mark counts from pixels of the digital image within a defined area including the each pixel of the digital image;

initializing a second pixel map to identify pixels of the digital image that exceed a threshold of the mark density;

updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;

updating the second pixel map to identify a plurality of additional pixels from the digital image, each pixel in the plurality of additional pixels adjacent to a pixel identified by the second pixel map;

updating the second pixel map by removing identifications of pixels also identified by the first pixel map;

generating a third pixel map identifying substantially all pixels of the digital image identified by neither the first pixel map nor the second pixel map;

compressing pixel data identified by the first pixel map by a first compression method;

compressing pixel data identified by the second pixel map by a second compression method;

compressing pixel data identified by the third pixel map by a third compression method; and constructing the at least one discrete packet comprising the pixel data compressed by the first, second and third compression methods, and the first, second and third pixel maps, wherein indicating the contrast detection by one from the plurality of contrast filters comprises:

a second pixel pattern filter identifying four adjacent in-line pixels comprising a first end pixel, a first middle pixel, a second middle pixel and a second end pixel;

the second pixel pattern filter identifying less than a first threshold difference in color between the first end pixel and the second end pixel;

the second pixel pattern filter identifying at least a second threshold difference in color between the first end pixel and at least one of a set comprising the first middle pixel and the second middle pixel; and the second pixel pattern filter indicating the contrast detection for each of the first end pixel, the first middle pixel, the second middle pixel and the second end pixel.

5. A method of transforming a digital image into at least one discrete packet for transmission to a remote client, the method executed under the control of a processor configured with computer executable instructions, comprising:

obtaining, from a digital source, the digital image;

initializing a first pixel map to identify essentially all contiguous sets of pixels from the digital image that have a defined color matching tolerance and exceeding a pixel count threshold;

determining a mark count for each pixel of the digital image, each mark of the mark count indicating a contrast detection by one of a plurality of contrast filters;

determining a mark density for the each pixel of the digital image that exceeds a threshold of the mark count, the mark density indicating an accumulation of the mark counts from pixels of the digital image within a defined area including the each pixel of the digital image;

initializing a second pixel map to identify pixels of the digital image that exceed a threshold of the mark density;

updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;

updating the second pixel map to identify a plurality of additional pixels from the digital image, each pixel in the plurality of additional pixels adjacent to a pixel identified by the second pixel map;

updating the second pixel map by removing identifications of pixels also identified by the first pixel map;

generating a third pixel map identifying substantially all pixels of the digital image identified by neither the first pixel map nor the second pixel map;

compressing pixel data identified by the first pixel map by a first compression method;

compressing pixel data identified by the second pixel map by a second compression method;

compressing pixel data identified by the third pixel map by a third compression method; and constructing the at least one discrete packet comprising the pixel data compressed by the first, second and third compression methods, and the first, second and third pixel maps, wherein indicating the contrast detection by one from the plurality of contrast filters comprises:

a third pixel pattern filter identifying five adjacent in-line pixels comprising a first end pixel, a middle pixel, and a second end pixel;

the third pixel pattern filter identifying less than a first threshold difference in color between the first end pixel and the second end pixel;

the third pixel pattern filter identifying at least a second threshold difference in color between the first end pixel and the middle pixel; and the third pixel pattern filter indicating the contrast detection for each of the five adjacent in-line pixels.

6. A method of transforming a digital image into at least one discrete packet for transmission to a remote client, the method executed under the control of a processor configured with computer executable instructions, comprising:

obtaining, from a digital source, the digital image;

initializing a first pixel map to identify essentially all contiguous sets of pixels from the digital image that have a defined color matching tolerance and exceeding a pixel count threshold;

determining a mark count for each pixel of the digital image, each mark of the mark count indicating a contrast detection by one of a plurality of contrast filters;

determining a mark density for the each pixel of the digital image that exceeds a threshold of the mark count, the mark density indicating an accumulation of the mark counts from pixels of the digital image within a defined area including the each pixel of the digital image;

initializing a second pixel map to identify pixels of the digital image that exceed a threshold of the mark density;

updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;

updating the second pixel map to identify a plurality of additional pixels from the digital image, each pixel in the plurality of additional pixels adjacent to a pixel identified by the second pixel map;

updating the second pixel map by removing identifications of pixels also identified by the first pixel map;

generating a third pixel map identifying substantially all pixels of the digital image identified by neither the first pixel map nor the second pixel map;

compressing pixel data identified by the first pixel map by a first compression method;

compressing pixel data identified by the second pixel map by a second compression method;

compressing pixel data identified by the third pixel map by a third compression method; and constructing the at least one discrete packet comprising the pixel data compressed by the first, second and third compression methods, and the first, second and third pixel maps, wherein:

the initializing the first pixel map comprises applying a constant color filter to essentially all pixels of the digital image independent of the determining the mark count and independent of initializing the second pixel map;

the initializing the second pixel map comprises applying a subset of the plurality of contrast filters to essentially all of the pixels of the digital image independent of the constant color filter and independent of the initializing the first pixel map;

the initializing the first pixel map and the initializing the second pixel map comprise identifying at least one pixel of the digital image in both the first pixel map and the second pixel map; and the third pixel map identifies at least one remaining pixel of the digital image identified neither in the first pixel map nor the second pixel map.

7. A method of transforming a digital image into at least one discrete packet for transmission to a remote client, the method executed under the control of a processor configured with computer executable instructions, comprising:

obtaining, from a digital source, the digital image;
initializing a first pixel map to identify essentially all contiguous sets of pixels from the digital image that have a defined color matching tolerance and exceeding a pixel count threshold;
determining a mark count for each pixel of the digital image, each mark of the mark count indicating a contrast detection by one of a plurality of contrast filters;
determining a mark density for the each pixel of the digital image that exceeds a threshold of the mark count, the mark density indicating an accumulation of the mark counts from pixels of the digital image within a defined area including the each pixel of the digital image;
initializing a second pixel map to identify pixels of the digital image that exceed a threshold of the mark density;
updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;
updating the second pixel map to identify a plurality of additional pixels from the digital image, each pixel in the plurality of additional pixels adjacent to a pixel identified by the second pixel map;
updating the second pixel map by removing identifications of pixels also identified by the first pixel map;
generating a third pixel map identifying substantially all pixels of the digital image identified by neither the first pixel map nor the second pixel map;
compressing pixel data identified by the first pixel map by a first compression method;
compressing pixel data identified by the second pixel map by a second compression method;
compressing pixel data identified by the third pixel map by a third compression method; and
constructing the at least one discrete packet comprising the pixel data compressed by the first, second and third compression methods, and the first, second and third pixel maps, wherein the at least one pixel identified by the second pixel map comprises a linear sequence of less than a fourth threshold number of pixels, the fourth threshold number of pixels comprising a fifth threshold number of pixels identified by the second pixel map and a sixth threshold number of pixels identified neither by the first pixel map nor the second pixel map.

8. A method of transforming a digital image into at least one discrete packet for transmission to a remote client, the method executed under the control of a processor configured with computer executable instructions, comprising:

obtaining, from a digital source, the digital image;
initializing a first pixel map to identify essentially all contiguous sets of pixels from the digital image that have a defined color matching tolerance and exceeding a pixel count threshold;
determining a mark count for each pixel of the digital image, each mark of the mark count indicating a contrast detection by one of a plurality of contrast filters;
determining a mark density for the each pixel of the digital image that exceeds a threshold of the mark count, the mark density indicating an accumulation of the mark counts from pixels of the digital image within a defined area including the each pixel of the digital image;
initializing a second pixel map to identify pixels of the digital image that exceed a threshold of the mark density;
updating the first pixel map to identify at least one additional pixel from the digital image, the at least one additional pixel comprising a color having the defined color matching tolerance to a pixel identified by the first pixel map, the at least one additional pixel separated from the pixel identified by the first pixel map by at least one pixel identified by the second pixel map;
updating the second pixel map to identify a plurality of additional pixels from the digital image, each pixel in the plurality of additional pixels adjacent to a pixel identified by the second pixel map;
updating the second pixel map by removing identifications of pixels also identified by the first pixel map;
generating a third pixel map identifying substantially all pixels of the digital image identified by neither the first pixel map nor the second pixel map;
compressing pixel data identified by the first pixel map by a first compression method;
compressing pixel data identified by the second pixel map by a second compression method;
compressing pixel data identified by the third pixel map by a third compression method; and
constructing the at least one discrete packet comprising the pixel data compressed by the first, second and third compression methods, and the first, second and third pixel maps, wherein indicating the contrast detection by one from the plurality of contrast filters comprises:
identifying within a straight line of pixels of the digital image at least a first threshold difference between pixel color values of a first two pixels; and at least one of:
identifying within the straight line of pixels a pixel of restricted color value; and
identifying, within the straight line of pixels, less that a second threshold difference between pixel color values of a second two pixels.

* * * * *